United States Patent
Slocum, III

(10) Patent No.: US 7,908,029 B2
(45) Date of Patent: Mar. 15, 2011

(54) PROCESSING STORAGE DEVICES

(75) Inventor: Richard W. Slocum, III, Amherst, NH (US)

(73) Assignee: Teradyne, Inc., North Reading, MA (US)

( * ) Notice: Subject to any disclaimer, the term of this patent is extended or adjusted under 35 U.S.C. 154(b) by 0 days.

(21) Appl. No.: 12/727,619

(22) Filed: Mar. 19, 2010

(65) Prior Publication Data
US 2010/0174404 A1    Jul. 8, 2010

Related U.S. Application Data

(63) Continuation of application No. 12/474,388, filed on May 29, 2009.

(60) Provisional application No. 61/058,396, filed on Jun. 3, 2008.

(51) Int. Cl.
*G07F 7/00* (2006.01)

(52) U.S. Cl. ........................................ 700/214

(58) Field of Classification Search .......... 700/214, 700/218, 228; 369/30.5, 30.48, 30.56, 30.6, 369/30.71, 30.42, 30.55, 30.86, 30.28
See application file for complete search history.

(56) References Cited

U.S. PATENT DOCUMENTS

| 557,186 A | 3/1896 | Cahill |
|---|---|---|
| 2,224,407 A | 12/1940 | Passur |
| 2,380,026 A | 7/1945 | Clarke |
| 2,631,775 A | 3/1953 | Gordon |
| 2,635,524 A | 4/1953 | Jenkins |
| 3,120,166 A | 2/1964 | Lyman |
| 3,360,032 A | 12/1967 | Sherwood |
| 3,364,838 A | 1/1968 | Bradley |
| 3,517,601 A | 6/1970 | Courchesne |
| 3,845,286 A | 10/1974 | Aronstein et al. |
| 4,147,299 A | 4/1979 | Freeman |
| 4,233,644 A | 11/1980 | Hwang et al. |
| 4,336,748 A | 6/1982 | Martin et al. |
| 4,379,259 A | 4/1983 | Varadi et al. |
| 4,477,127 A | 10/1984 | Kume |
| 4,495,545 A | 1/1985 | Dufresne et al. |
| 4,526,318 A | 7/1985 | Fleming et al. |

(Continued)

FOREIGN PATENT DOCUMENTS

AU    583716    5/1989

(Continued)

OTHER PUBLICATIONS

Abraham et al., "Thermal Proximity Imaging of Hard-Disk Substrates", IEEE Transactions on Mathematics 36:3997-4004, Nov. 2000.

(Continued)

*Primary Examiner* — Gene Crawford
*Assistant Examiner* — Ramya Prakasam
(74) *Attorney, Agent, or Firm* — Fish & Richardson P.C.

(57) ABSTRACT

A storage device processing system that includes at least one automated transporter, at least one rack accessible by the at least one automated transporter, and multiple test slots housed by the at least one rack. Each test slot is configured to receive a storage device for testing. The storage device processing system includes a conveyor arranged in a loop around and being accessible by the at least one automated transporter. The conveyor receives and transports the storage device thereon. The at least one automated transporter is configured to transfer the storage device between the conveyor and one of the test slots of the at least one rack.

17 Claims, 13 Drawing Sheets

U.S. PATENT DOCUMENTS

| | | |
|---|---|---|
| 4,620,248 A | 10/1986 | Gitzendanner |
| 4,648,007 A | 3/1987 | Garner |
| 4,654,732 A | 3/1987 | Mesher |
| 4,665,455 A | 5/1987 | Mesher |
| 4,683,424 A | 7/1987 | Cutright et al. |
| 4,685,303 A | 8/1987 | Branc et al. |
| 4,688,124 A | 8/1987 | Scribner et al. |
| 4,713,714 A | 12/1987 | Gatti et al. |
| 4,739,444 A | 4/1988 | Zushi et al. |
| 4,754,397 A | 6/1988 | Varaiya et al. |
| 4,768,285 A | 9/1988 | Woodman, Jr. |
| 4,778,063 A | 10/1988 | Ueberreiter |
| 4,787,074 A * | 11/1988 | Deck et al. .................. 369/30.55 |
| 4,801,234 A | 1/1989 | Cedrone |
| 4,809,881 A | 3/1989 | Becker |
| 4,817,071 A * | 3/1989 | Carlson et al. ............... 369/30.6 |
| 4,817,273 A | 4/1989 | Lape et al. |
| 4,817,934 A | 4/1989 | McCormick et al. |
| 4,851,965 A | 7/1989 | Gabuzda et al. |
| 4,881,591 A | 11/1989 | Rignall |
| 4,888,549 A | 12/1989 | Wilson et al. |
| 4,911,281 A | 3/1990 | Jenkner |
| 4,967,155 A | 10/1990 | Magnuson |
| 5,012,187 A | 4/1991 | Littlebury |
| 5,045,960 A | 9/1991 | Eding |
| 5,061,630 A | 10/1991 | Knopf et al. |
| 5,119,270 A | 6/1992 | Bolton et al. |
| 5,122,914 A | 6/1992 | Hanson |
| 5,127,684 A | 7/1992 | Klotz et al. |
| 5,128,813 A | 7/1992 | Lee |
| 5,136,395 A | 8/1992 | Ishii et al. |
| 5,158,132 A | 10/1992 | Guillemot |
| 5,168,424 A | 12/1992 | Bolton et al. |
| 5,171,183 A | 12/1992 | Pollard et al. |
| 5,173,819 A | 12/1992 | Takahashi et al. |
| 5,176,202 A | 1/1993 | Richard |
| 5,205,132 A | 4/1993 | Fu |
| 5,206,772 A | 4/1993 | Hirano et al. |
| 5,207,613 A | 5/1993 | Ferchau et al. |
| 5,210,680 A | 5/1993 | Scheibler |
| 5,237,484 A | 8/1993 | Ferchau et al. |
| 5,263,537 A | 11/1993 | Plucinski et al. |
| 5,269,698 A | 12/1993 | Singer |
| 5,295,392 A | 3/1994 | Hensel et al. |
| 5,309,323 A | 5/1994 | Gray et al. |
| 5,325,263 A | 6/1994 | Singer et al. |
| 5,349,486 A | 9/1994 | Sugimoto et al. |
| 5,368,072 A | 11/1994 | Cote |
| 5,374,395 A | 12/1994 | Robinson et al. |
| 5,379,229 A | 1/1995 | Parsons et al. |
| 5,398,058 A | 3/1995 | Hattori |
| 5,412,534 A | 5/1995 | Cutts et al. |
| 5,414,591 A | 5/1995 | Kimura et al. |
| 5,426,581 A | 6/1995 | Kishi et al. |
| 5,469,037 A | 11/1995 | McMurtrey, Sr. et al. |
| 5,477,416 A | 12/1995 | Schkrohowsky et al. |
| 5,484,012 A | 1/1996 | Hiratsuka |
| 5,486,681 A | 1/1996 | Dagnac et al. |
| 5,491,610 A | 2/1996 | Mok et al. |
| 5,543,727 A | 8/1996 | Bushard et al. |
| 5,546,250 A | 8/1996 | Diel |
| 5,557,186 A | 9/1996 | McMurtrey, Sr. et al. |
| 5,563,768 A | 10/1996 | Perdue |
| 5,570,740 A | 11/1996 | Flores et al. |
| 5,593,380 A | 1/1997 | Bittikofer |
| 5,601,141 A | 2/1997 | Gordon et al. |
| 5,604,662 A | 2/1997 | Anderson et al. |
| 5,610,893 A | 3/1997 | Soga et al. |
| 5,617,430 A | 4/1997 | Angelotti et al. |
| 5,644,705 A | 7/1997 | Stanley |
| 5,646,918 A | 7/1997 | Dimitri et al. |
| 5,654,846 A | 8/1997 | Wicks et al. |
| 5,673,029 A | 9/1997 | Behl et al. |
| 5,694,290 A | 12/1997 | Chang |
| 5,718,627 A | 2/1998 | Wicks |
| 5,718,628 A | 2/1998 | Nakazato et al. |
| 5,731,928 A | 3/1998 | Jabbari et al. |
| 5,751,549 A | 5/1998 | Eberhardt et al. |
| 5,754,365 A | 5/1998 | Beck et al. |
| 5,761,032 A | 6/1998 | Jones |
| 5,793,610 A | 8/1998 | Schmitt et al. |
| 5,811,678 A | 9/1998 | Hirano |
| 5,812,761 A | 9/1998 | Seki et al. |
| 5,819,842 A | 10/1998 | Potter et al. |
| 5,831,525 A | 11/1998 | Harvey |
| 5,851,143 A | 12/1998 | Hamid |
| 5,859,409 A | 1/1999 | Kim et al. |
| 5,859,540 A | 1/1999 | Fukumoto |
| 5,862,037 A | 1/1999 | Behl |
| 5,870,630 A | 2/1999 | Reasoner et al. |
| 5,886,639 A | 3/1999 | Behl et al. |
| 5,890,959 A | 4/1999 | Pettit et al. |
| 5,912,799 A | 6/1999 | Grouell et al. |
| 5,913,926 A | 6/1999 | Anderson et al. |
| 5,914,856 A | 6/1999 | Morton et al. |
| 5,927,386 A | 7/1999 | Lin |
| 5,956,301 A | 9/1999 | Dimitri et al. |
| 5,959,834 A | 9/1999 | Chang |
| 5,999,356 A | 12/1999 | Dimitri et al. |
| 5,999,365 A | 12/1999 | Hasegawa et al. |
| 6,000,623 A | 12/1999 | Blatti et al. |
| 6,005,404 A | 12/1999 | Cochran et al. |
| 6,005,770 A | 12/1999 | Schmitt |
| 6,008,636 A | 12/1999 | Miller et al. |
| 6,008,984 A | 12/1999 | Cunningham et al. |
| 6,011,689 A | 1/2000 | Wrycraft |
| 6,031,717 A | 2/2000 | Baddour et al. |
| 6,034,870 A | 3/2000 | Osborn et al. |
| 6,042,348 A | 3/2000 | Aakalu et al. |
| 6,045,113 A | 4/2000 | Itakura |
| 6,055,814 A | 5/2000 | Song |
| 6,066,822 A | 5/2000 | Nemoto et al. |
| 6,067,225 A | 5/2000 | Reznikov et al. |
| 6,069,792 A | 5/2000 | Nelik |
| 6,084,768 A | 7/2000 | Bolognia |
| 6,094,342 A | 7/2000 | Dague et al. |
| 6,104,607 A | 8/2000 | Behl |
| 6,115,250 A | 9/2000 | Schmitt |
| 6,122,131 A | 9/2000 | Jeppson |
| 6,122,232 A | 9/2000 | Schell et al. |
| 6,124,707 A | 9/2000 | Kim et al. |
| 6,130,817 A | 10/2000 | Flotho et al. |
| 6,144,553 A | 11/2000 | Hileman et al. |
| 6,166,901 A | 12/2000 | Gamble et al. |
| 6,169,413 B1 | 1/2001 | Pack et al. |
| 6,169,930 B1 | 1/2001 | Blachek et al. |
| 6,177,805 B1 | 1/2001 | Pih |
| 6,178,835 B1 | 1/2001 | Orriss et al. |
| 6,181,557 B1 | 1/2001 | Gatti |
| 6,183,186 B1 * | 2/2001 | Howells et al. .......... 414/416.03 |
| 6,185,065 B1 | 2/2001 | Hasegawa et al. |
| 6,185,097 B1 | 2/2001 | Behl |
| 6,188,191 B1 | 2/2001 | Frees et al. |
| 6,192,282 B1 | 2/2001 | Smith et al. |
| 6,193,339 B1 | 2/2001 | Behl et al. |
| 6,209,842 B1 | 4/2001 | Anderson et al. |
| 6,227,516 B1 | 5/2001 | Webster, Jr. et al. |
| 6,229,275 B1 | 5/2001 | Yamamoto |
| 6,231,145 B1 | 5/2001 | Liu |
| 6,233,148 B1 | 5/2001 | Shen |
| 6,236,563 B1 | 5/2001 | Buican et al. |
| 6,247,944 B1 | 6/2001 | Bolognia et al. |
| 6,249,824 B1 | 6/2001 | Henrichs |
| 6,252,769 B1 | 6/2001 | Tullstedt et al. |
| 6,262,863 B1 | 7/2001 | Ostwald et al. |
| 6,272,007 B1 | 8/2001 | Kitlas et al. |
| 6,272,767 B1 | 8/2001 | Botruff et al. |
| 6,281,677 B1 | 8/2001 | Cosci et al. |
| 6,282,501 B1 | 8/2001 | Assouad |
| 6,285,524 B1 | 9/2001 | Boigenzahn et al. |
| 6,289,678 B1 | 9/2001 | Pandolfi |
| 6,297,950 B1 | 10/2001 | Erwin |
| 6,298,672 B1 | 10/2001 | Valicoff, Jr. |
| 6,302,714 B1 | 10/2001 | Bolognia et al. |
| 6,304,839 B1 | 10/2001 | Ho et al. |
| 6,307,386 B1 | 10/2001 | Fowler et al. |
| 6,327,150 B1 | 12/2001 | Levy et al. |

| | | | | | | |
|---|---|---|---|---|---|---|
| 6,330,154 B1 | 12/2001 | Fryers et al. | | 7,006,325 B2 | 2/2006 | Emberty et al. |
| 6,351,379 B1 | 2/2002 | Cheng | | 7,039,924 B2 | 5/2006 | Goodman et al. |
| 6,354,792 B1 | 3/2002 | Kobayashi et al. | | 7,054,150 B2 | 5/2006 | Orriss et al. |
| 6,356,409 B1 | 3/2002 | Price et al. | | 7,070,323 B2 | 7/2006 | Wanek et al. |
| 6,356,415 B1 | 3/2002 | Kabasawa | | 7,076,391 B1 | 7/2006 | Pakzad et al. |
| 6,384,995 B1 | 5/2002 | Smith | | 7,077,614 B1 | 7/2006 | Hasper et al. |
| 6,388,437 B1 | 5/2002 | Wolski et al. | | 7,088,541 B1 | 8/2006 | Orriss et al. |
| 6,388,875 B1 | 5/2002 | Chen | | 7,092,251 B1 | 8/2006 | Henry |
| 6,388,878 B1 | 5/2002 | Chang | | 7,106,582 B2 | 9/2006 | Albrecht et al. |
| 6,389,225 B1 | 5/2002 | Malinoski et al. | | 7,123,477 B2 | 10/2006 | Coglitore et al. |
| 6,411,584 B2 | 6/2002 | Davis et al. | | 7,126,777 B2 | 10/2006 | Flechsig et al. |
| 6,421,236 B1 | 7/2002 | Montoya et al. | | 7,130,138 B2 | 10/2006 | Lum et al. |
| 6,434,000 B1 | 8/2002 | Pandolfi | | 7,134,553 B2 | 11/2006 | Stephens |
| 6,434,498 B1 | 8/2002 | Ulrich et al. | | 7,139,145 B1 | 11/2006 | Archibald et al. |
| 6,434,499 B1 | 8/2002 | Ulrich et al. | | 7,164,579 B2 | 1/2007 | Muncaster et al. |
| 6,464,080 B1 | 10/2002 | Morris et al. | | 7,167,360 B2 | 1/2007 | Inoue et al. |
| 6,467,153 B2 | 10/2002 | Butts et al. | | 7,181,458 B1 | 2/2007 | Higashi |
| 6,473,297 B1 | 10/2002 | Behl et al. | | 7,203,021 B1 | 4/2007 | Ryan et al. |
| 6,473,301 B1 | 10/2002 | Levy et al. | | 7,203,060 B2 | 4/2007 | Kay et al. |
| 6,476,627 B1 | 11/2002 | Pelissier et al. | | 7,206,201 B2 | 4/2007 | Behl et al. |
| 6,477,044 B2 | 11/2002 | Foley et al. | | 7,216,968 B2 | 5/2007 | Smith et al. |
| 6,477,442 B1 | 11/2002 | Valerino, Sr. | | 7,219,028 B2 | 5/2007 | Bae et al. |
| 6,480,380 B1 | 11/2002 | French et al. | | 7,219,273 B2 | 5/2007 | Fisher et al. |
| 6,480,382 B2 | 11/2002 | Cheng | | 7,227,746 B2 | 6/2007 | Tanaka et al. |
| 6,487,071 B1 | 11/2002 | Tata et al. | | 7,232,101 B2 | 6/2007 | Wanek et al. |
| 6,489,793 B2 | 12/2002 | Jones et al. | | 7,243,043 B2 | 7/2007 | Shin |
| 6,494,663 B2 | 12/2002 | Ostwald et al. | | 7,248,467 B2 | 7/2007 | Sri-Jayantha et al. |
| 6,525,933 B2 | 2/2003 | Eland | | 7,259,966 B2 | 8/2007 | Connelly, Jr. et al. |
| 6,526,841 B1 | 3/2003 | Wanek et al. | | 7,273,344 B2 | 9/2007 | Ostwald et al. |
| 6,535,384 B2 | 3/2003 | Huang | | 7,280,353 B2 | 10/2007 | Wendel et al. |
| 6,537,013 B2 | 3/2003 | Emberty et al. | | 7,289,885 B2 | 10/2007 | Basham et al. |
| 6,544,309 B1 | 4/2003 | Hoefer et al. | | 7,304,855 B1 | 12/2007 | Milligan et al. |
| 6,546,445 B1 | 4/2003 | Hayes | | 7,315,447 B2 | 1/2008 | Inoue et al. |
| 6,553,532 B1 | 4/2003 | Aoki | | 7,349,205 B2 | 3/2008 | Hall et al. |
| 6,560,107 B1 | 5/2003 | Beck et al. | | 7,353,524 B1 | 4/2008 | Lin et al. |
| 6,565,163 B2 | 5/2003 | Behl et al. | | 7,385,385 B2 | 6/2008 | Magliocco et al. |
| 6,566,859 B2 | 5/2003 | Wolski et al. | | 7,395,133 B2 | 7/2008 | Lowe |
| 6,567,266 B2 | 5/2003 | Ives et al. | | 7,403,451 B2 | 7/2008 | Goodman et al. |
| 6,570,734 B2 | 5/2003 | Ostwald et al. | | 7,435,046 B2 | 10/2008 | Kiaie et al. |
| 6,577,586 B1 | 6/2003 | Yang et al. | | 7,437,212 B2 | 10/2008 | Farchmin et al. |
| 6,577,687 B2 | 6/2003 | Hall et al. | | 7,447,011 B2 | 11/2008 | Wade et al. |
| 6,618,254 B2 | 9/2003 | Ives | | 7,457,112 B2 | 11/2008 | Fukuda et al. |
| 6,626,846 B2 | 9/2003 | Spencer | | 7,467,024 B2 | 12/2008 | Flitsch |
| 6,628,518 B2 | 9/2003 | Behl et al. | | 7,476,362 B2 | 1/2009 | Angros |
| 6,635,115 B1 | 10/2003 | Fairbairn et al. | | 7,483,269 B1 | 1/2009 | Marvin, Jr. et al. |
| 6,640,235 B1 | 10/2003 | Anderson | | 7,505,264 B2 | 3/2009 | Hall et al. |
| 6,644,982 B1 | 11/2003 | Ondricek et al. | | 7,554,811 B2 | 6/2009 | Scicluna et al. |
| 6,651,192 B1 | 11/2003 | Viglione et al. | | 7,568,122 B2 | 7/2009 | Mechalke et al. |
| 6,654,240 B1 | 11/2003 | Tseng et al. | | 7,570,455 B2 | 8/2009 | Deguchi et al. |
| 6,679,128 B2 | 1/2004 | Wanek et al. | | 7,573,715 B2 | 8/2009 | Mojaver et al. |
| 6,693,757 B2 | 2/2004 | Hayakawa et al. | | 7,584,851 B2 | 9/2009 | Hong et al. |
| 6,718,164 B1 | 4/2004 | Korneluk et al. | | 7,612,996 B2 | 11/2009 | Atkins et al. |
| 6,741,529 B1 | 5/2004 | Getreuer | | 7,625,027 B2 | 12/2009 | Kiaie et al. |
| 6,746,648 B1 | 6/2004 | Mattila et al. | | 7,630,196 B2 | 12/2009 | Hall et al. |
| 6,751,093 B1 | 6/2004 | Hsu et al. | | 7,643,289 B2 | 1/2010 | Ye et al. |
| 6,791,785 B1 | 9/2004 | Messenger et al. | | 7,646,596 B2 | 1/2010 | Ng |
| 6,791,799 B2 | 9/2004 | Fletcher | | 7,729,107 B2 | 6/2010 | Atkins et al. |
| 6,798,651 B2 | 9/2004 | Syring et al. | | 2001/0006453 A1 | 7/2001 | Glorioso et al. |
| 6,798,972 B1 | 9/2004 | Ito et al. | | 2001/0044023 A1 | 11/2001 | Johnson et al. |
| 6,801,834 B1 | 10/2004 | Konshak et al. | | 2001/0046118 A1 | 11/2001 | Yamanashi et al. |
| 6,806,700 B2 | 10/2004 | Wanek et al. | | 2001/0048590 A1 | 12/2001 | Behl et al. |
| 6,811,427 B2 | 11/2004 | Garrett et al. | | 2002/0030981 A1 | 3/2002 | Sullivan et al. |
| 6,826,046 B1 | 11/2004 | Muncaster et al. | | 2002/0044416 A1 | 4/2002 | Harmon, III et al. |
| 6,830,372 B2 | 12/2004 | Liu et al. | | 2002/0051338 A1 | 5/2002 | Jiang et al. |
| 6,832,929 B2 | 12/2004 | Garrett et al. | | 2002/0071248 A1 | 6/2002 | Huang et al. |
| 6,861,861 B2 | 3/2005 | Song et al. | | 2002/0079422 A1 | 6/2002 | Jiang |
| 6,862,173 B1 | 3/2005 | Konshak et al. | | 2002/0090320 A1 | 7/2002 | Burow et al. |
| 6,867,939 B2 | 3/2005 | Katahara et al. | | 2002/0116087 A1 | 8/2002 | Brown |
| 6,892,328 B2 | 5/2005 | Klein et al. | | 2002/0161971 A1 | 10/2002 | Dimitri et al. |
| 6,904,479 B2 | 6/2005 | Hall et al. | | 2002/0172004 A1 | 11/2002 | Ives et al. |
| 6,908,330 B2 | 6/2005 | Garrett et al. | | 2003/0035271 A1 | 2/2003 | Lelong et al. |
| 6,928,336 B2 | 8/2005 | Peshkin et al. | | 2003/0043550 A1 | 3/2003 | Ives |
| 6,937,432 B2 | 8/2005 | Sri-Jayantha et al. | | 2003/0206397 A1 | 11/2003 | Allgeyer et al. |
| 6,957,291 B2 | 10/2005 | Moon et al. | | 2004/0165489 A1 | 8/2004 | Goodman et al. |
| 6,965,811 B2 | 11/2005 | Dickey et al. | | 2004/0230399 A1 | 11/2004 | Shin |
| 6,974,017 B2 | 12/2005 | Oseguera | | 2004/0236465 A1 | 11/2004 | Butka et al. |
| 6,976,190 B1 | 12/2005 | Goldstone | | 2004/0264121 A1 | 12/2004 | Orriss et al. |
| 6,980,381 B2 | 12/2005 | Gray et al. | | 2005/0004703 A1 | 1/2005 | Christie, Jr. |
| 6,982,872 B2 | 1/2006 | Behl et al. | | 2005/0010836 A1 | 1/2005 | Bae et al. |

| | | | | | | |
|---|---|---|---|---|---|---|
| 2005/0018397 A1 | 1/2005 | Kay et al. | EP | 0635836 | 1/1995 | |
| 2005/0055601 A1 | 3/2005 | Wilson et al. | EP | 741508 | 11/1996 | |
| 2005/0057849 A1 | 3/2005 | Twogood et al. | EP | 0757320 | 2/1997 | |
| 2005/0069400 A1 | 3/2005 | Dickey et al. | EP | 0757351 | 2/1997 | |
| 2005/0109131 A1 | 5/2005 | Wanek et al. | EP | 0840476 | 5/1998 | |
| 2005/0116702 A1 | 6/2005 | Wanek et al. | EP | 1 045 301 A | 10/2000 | |
| 2005/0131578 A1 | 6/2005 | Weaver | EP | 1209557 | 5/2002 | |
| 2005/0179457 A1 | 8/2005 | Min et al. | EP | 1422713 | 5/2004 | |
| 2005/0207059 A1 | 9/2005 | Cochrane | EP | 1234308 | 5/2006 | |
| 2005/0219809 A1 | 10/2005 | Muncaster et al. | EP | 1760722 | 3/2007 | |
| 2005/0225338 A1 | 10/2005 | Sands et al. | EP | 1612798 | 11/2007 | |
| 2005/0270737 A1 | 12/2005 | Wilson et al. | GB | 2241118 | 8/1991 | |
| 2006/0023331 A1 | 2/2006 | Flechsig et al. | GB | 2276275 | 9/1994 | |
| 2006/0028802 A1 | 2/2006 | Shaw et al. | GB | 2299436 | 10/1996 | |
| 2006/0066974 A1 | 3/2006 | Akamatsu et al. | GB | 2312984 | 11/1997 | |
| 2006/0130316 A1 | 6/2006 | Takase et al. | GB | 2328782 | 3/1999 | |
| 2006/0190205 A1 | 8/2006 | Klein et al. | GB | 2439844 | 7/2008 | |
| 2006/0227517 A1 | 10/2006 | Zayas et al. | JP | 61-115279 | 6/1986 | |
| 2006/0250766 A1 | 11/2006 | Blaalid et al. | JP | 62-177621 | 8/1987 | |
| 2006/0269384 A1 | 11/2006 | Kiaie et al. | JP | 62-239394 | 10/1987 | |
| 2007/0034368 A1 | 2/2007 | Atkins et al. | JP | 62-251915 | 11/1987 | |
| 2007/0035874 A1 | 2/2007 | Wendel et al. | JP | 63-002160 | 1/1988 | |
| 2007/0035875 A1 | 2/2007 | Hall et al. | JP | 63-004483 | 1/1988 | |
| 2007/0053154 A1 | 3/2007 | Fukuda et al. | JP | 63-016482 | 1/1988 | |
| 2007/0082907 A1 | 4/2007 | Canada et al. | JP | 63-062057 | 3/1988 | |
| 2007/0127202 A1 | 6/2007 | Scicluna et al. | JP | 63-201946 | 8/1988 | |
| 2007/0127206 A1 | 6/2007 | Wade et al. | JP | 63-214972 | 9/1988 | |
| 2007/0195497 A1 | 8/2007 | Atkins | JP | 63-269376 | 11/1988 | |
| 2007/0248142 A1 | 10/2007 | Rountree et al. | JP | 63-195697 | 12/1988 | |
| 2007/0253157 A1 | 11/2007 | Atkins et al. | JP | 64-089034 | 4/1989 | |
| 2007/0286045 A1 | 12/2007 | Onagi et al. | JP | 2-091565 | 3/1990 | |
| 2008/0007865 A1 | 1/2008 | Orriss et al. | JP | 2-098197 | 4/1990 | |
| 2008/0030945 A1 | 2/2008 | Mojaver et al. | JP | 2-185784 | 7/1990 | |
| 2008/0112075 A1 | 5/2008 | Farquhar et al. | JP | 2-199690 | 8/1990 | |
| 2008/0239564 A1 | 10/2008 | Farquhar et al. | JP | 2-278375 | 11/1990 | |
| 2008/0282275 A1 | 11/2008 | Zaczek et al. | JP | 2-297770 | 12/1990 | |
| 2008/0282278 A1 | 11/2008 | Barkley | JP | 3-008086 | 1/1991 | |
| 2009/0028669 A1 | 1/2009 | Rebstock | JP | 3-078160 | 4/1991 | |
| 2009/0082907 A1 | 3/2009 | Stuvel et al. | JP | 3-105704 | 5/1991 | |
| 2009/0122443 A1 | 5/2009 | Farquhar et al. | JP | 3-207947 | 9/1991 | |
| 2009/0142169 A1 | 6/2009 | Garcia et al. | JP | 3-210662 | 9/1991 | |
| 2009/0153992 A1 | 6/2009 | Garcia et al. | JP | 3-212859 | 9/1991 | |
| 2009/0153993 A1 | 6/2009 | Garcia et al. | JP | 3-214490 | 9/1991 | |
| 2009/0153994 A1 | 6/2009 | Merrow et al. | JP | 3-240821 | 10/1991 | |
| 2009/0175705 A1 | 7/2009 | Nakao et al. | JP | 3-295071 | 12/1991 | |
| 2009/0261047 A1 | 10/2009 | Merrow | JP | 4-017134 | 1/1992 | |
| 2009/0261228 A1 | 10/2009 | Merrow | JP | 4-143989 | 5/1992 | |
| 2009/0261229 A1 | 10/2009 | Merrow | JP | 4-172658 | 6/1992 | |
| 2009/0262444 A1 | 10/2009 | Polyakov et al. | JP | 4-214288 | 8/1992 | |
| 2009/0262445 A1 | 10/2009 | Noble et al. | JP | 4-247385 | 9/1992 | |
| 2009/0262454 A1 | 10/2009 | Merrow | JP | 4-259956 | 9/1992 | |
| 2009/0262455 A1 | 10/2009 | Merrow | JP | 4-307440 | 10/1992 | |
| 2009/0265032 A1 | 10/2009 | Toscano et al. | JP | 4-325923 | 11/1992 | |
| 2009/0265043 A1 | 10/2009 | Merrow | JP | 5-035053 | 2/1993 | |
| 2009/0265136 A1 | 10/2009 | Garcia et al. | JP | 5-035415 | 2/1993 | |
| 2009/0297328 A1 | 12/2009 | Slocum, III | JP | 5-066896 | 3/1993 | |
| | | | JP | 5-068257 | 3/1993 | |
| | FOREIGN PATENT DOCUMENTS | | JP | 5-073566 | 3/1993 | |
| CN | 1177187 | 3/1998 | JP | 5-073803 | 3/1993 | |
| CN | 2341188 | 9/1999 | JP | 5-101603 | 4/1993 | |
| CN | 1114109 | 7/2003 | JP | 5-173718 | 7/1993 | |
| CN | 1192544 | 3/2005 | JP | 5-189163 | 7/1993 | |
| DE | 3786944 | 11/1993 | JP | 5-204725 | 8/1993 | |
| DE | 69111634 | 5/1996 | JP | 5-223551 | 8/1993 | |
| DE | 69400145 | 10/1996 | JP | 6-004220 | 1/1994 | |
| DE | 19701548 | 8/1997 | JP | 6-004981 | 1/1994 | |
| DE | 19804813 | 9/1998 | JP | 6-162645 | 6/1994 | |
| DE | 69614460 | 6/2002 | JP | 6-181561 | 6/1994 | |
| DE | 69626584 | 12/2003 | JP | 6-215515 | 8/1994 | |
| DE | 19861388 | 8/2007 | JP | 6-274943 | 9/1994 | |
| EP | 0210497 | 7/1986 | JP | 6-314173 | 11/1994 | |
| EP | 0242970 | 10/1987 | JP | 7-007321 | 1/1995 | |
| EP | 0 277 634 A | 8/1988 | JP | 7-029364 | 1/1995 | |
| EP | 0356977 | 8/1989 | JP | 7-037376 | 2/1995 | |
| EP | 0442642 | 2/1991 | JP | 7-056654 | 3/1995 | |
| EP | 0466073 | 7/1991 | JP | 7-111078 | 4/1995 | |
| EP | 0776009 | 11/1991 | JP | 7-115497 | 5/1995 | |
| EP | 0582017 | 2/1994 | JP | 7-201082 | 8/1995 | |
| EP | 0617570 | 9/1994 | JP | 7-226023 | 8/1995 | |

| | | |
|---|---:|---|
| JP | 7-230669 | 8/1995 |
| JP | 7-257525 | 10/1995 |
| JP | 1982246 | 10/1995 |
| JP | 7-307059 | 11/1995 |
| JP | 8007994 | 1/1996 |
| JP | 8-030398 | 2/1996 |
| JP | 8-030407 | 2/1996 |
| JP | 8-079672 | 3/1996 |
| JP | 8-106776 | 4/1996 |
| JP | 8-110821 | 4/1996 |
| JP | 8-167231 | 6/1996 |
| JP | 8-212015 | 8/1996 |
| JP | 8-244313 | 9/1996 |
| JP | 8-263525 | 10/1996 |
| JP | 8-263909 | 10/1996 |
| JP | 8-297957 | 11/1996 |
| JP | 2553315 | 11/1996 |
| JP | 9-044445 | 2/1997 |
| JP | 9-064571 | 3/1997 |
| JP | 9-082081 | 3/1997 |
| JP | 2635127 | 7/1997 |
| JP | 9-306094 | 11/1997 |
| JP | 9-319466 | 12/1997 |
| JP | 10-040021 | 2/1998 |
| JP | 10-049365 | 2/1998 |
| JP | 10-064173 | 3/1998 |
| JP | 10-098521 | 4/1998 |
| JP | 2771297 | 7/1998 |
| JP | 10-275137 | 10/1998 |
| JP | 10-281799 | 10/1998 |
| JP | 10-320128 | 12/1998 |
| JP | 10-340139 | 12/1998 |
| JP | 2862679 | 3/1999 |
| JP | 11-134852 | 5/1999 |
| JP | 11-139839 | 5/1999 |
| JP | 2906930 | 6/1999 |
| JP | 11-203201 | 7/1999 |
| JP | 11-213182 | 8/1999 |
| JP | 11-327800 | 11/1999 |
| JP | 11-353128 | 12/1999 |
| JP | 11-353129 | 12/1999 |
| JP | 2000-056935 | 2/2000 |
| JP | 2000-066845 | 3/2000 |
| JP | 2000-112831 | 4/2000 |
| JP | 2000-113563 | 4/2000 |
| JP | 2000-114759 | 4/2000 |
| JP | 2000-125290 | 4/2000 |
| JP | 3052183 | 4/2000 |
| JP | 2000-132704 | 5/2000 |
| JP | 2000-149431 | 5/2000 |
| JP | 2000-228686 | 8/2000 |
| JP | 2000-235762 | 8/2000 |
| JP | 2000-236188 | 8/2000 |
| JP | 2000-242598 | 9/2000 |
| JP | 2000-278647 | 10/2000 |
| JP | 3097994 | 10/2000 |
| JP | 2000-305860 | 11/2000 |
| JP | 2001-005501 | 1/2001 |
| JP | 2001-023270 | 1/2001 |
| JP | 2001-100925 | 4/2001 |
| JP | 2002-42446 | 2/2002 |
| JP | 2007-87498 | 4/2007 |
| JP | 2007-188615 | 7/2007 |
| JP | 2007-220184 | 8/2007 |
| JP | 2007-293936 | 11/2007 |
| JP | 2007-305206 | 11/2007 |
| JP | 2007-305290 | 11/2007 |
| JP | 2007-328761 | 12/2007 |
| JP | 2008-503824 | 2/2008 |
| KR | 10-1998-0035445 | 8/1998 |
| KR | 10-0176527 | 11/1998 |
| KR | 10-0214308 | 8/1999 |
| KR | 10-0403039 | 10/2003 |
| SG | 45223 | 1/1998 |
| TW | 387574 | 4/2000 |
| WO | WO 89/01682 | 2/1989 |
| WO | WO 97/06532 | 2/1997 |
| WO | WO 00/49487 | 2/2000 |
| WO | WO 00/67253 | 11/2000 |
| WO | WO 01/09627 | 2/2001 |
| WO | WO 01/41148 | 6/2001 |
| WO | WO 03/013783 | 2/2003 |
| WO | WO 03/021597 | 3/2003 |
| WO | WO 03/021598 | 3/2003 |
| WO | WO 03/067385 | 8/2003 |
| WO | WO 2004/006260 | 1/2004 |
| WO | WO 2004/114286 | 12/2004 |
| WO | WO 2005/024830 | 3/2005 |
| WO | WO 2005/024831 | 3/2005 |
| WO | WO 2005/109131 | 11/2005 |
| WO | WO 2006/030185 | 3/2006 |
| WO | WO 2006/048611 | 5/2006 |
| WO | WO 2006/100441 | 9/2006 |
| WO | WO 2006/100445 | 9/2006 |
| WO | WO 2007/031729 | 3/2007 |

OTHER PUBLICATIONS

Abramovitch, "Rejecting Rotational Disturbances on Small Disk Drives Using Rotational Accelerometers", Proceedings of the 1996 IFAC World Congress in San Francisco, CA, Jul. 1996 http://dabramovitch.com/pubs/amrfac_matj.pdf.

Ali et al., "Modeling and Simulation of Hard Disk Drive Final Assembly Using a HDD Template" Proceedings of the 2007 Winter Simulation Conference, IEEE pp. 1641-1650, 2007 http://portal.acm.org/citation.cfm?id=1351837.

Anderson et al., "Clinical chemistry: concepts and applications", The McGraw-Hill Companies, Inc., pp. 131-132, 2003.

Anderson et al., "High Reliability Variable Load Time Controllable Vibration Free Thermal Processing Environment", Delphion, hhttps://www.delphion.com/tdbs/tdb?order=93A+63418, 3 pages, Mar. 18, 2009.

Asbrand, "Engineers at One Company Share the Pride and the Profits of Successful Product Design", Professional Issues, 4 pages, 1987.

Bair et al., "Measurements of Asperity Temperatures of a Read/Write Head Slider Bearing in Hard Magnetic Recording Disks", Journal of Tribology 113:547-554, Jul. 1991.

Bakken et al., "Low Cost, Rack Mounted, Direct Access Disk Storage Device", www.ip.com, 4 pages, Mar. 3, 2005.

Biber et al., "Disk Drive Drawer Thermal Management", Advances in Electronic Packaging vol. 1:43-46, 1995.

Christensen, "How Can Great firms Fail? Insights from the hard Disk Drive Industry", Harvard Business School Press, pp. 1-26, 2006.

Chung et al., "Vibration Absorber for Reduction of the In-plane Vibration in an Optical Disk Drive", IEEE Transactions on Consumer Electronics, Vo. 48, May 2004.

Curtis et al., "InPhase Professional Archive Drive Architecture" Dec. 17, 2007 http://www.science.edu/TechoftheYear/Nominees/InPhase/Holographic%20Storage.pdf.

Findeis et al., "Vibration Isolation Techniques Sutiable for Portable Electronic Speckle Pattern Interferometry", Proc. SPIE vol. 4704, pp. 159-167, 2002 . http://www.ndt.uct.ac.za/Papers/spiendt2002.pdf.

FlexStar Technology, 30E/Cascade Users Manual, Doc #98-36387-00 Rev. 1.8, pp. 1-33.

FlexStar Technology, "A World of Storage Testing Solutions," http://www.flexstar.com, 1 page (1999).

FlexStar Technology, "Environment Chamber Products," http://www.flexstar.com, 1 page (1999).

FlexStar Technology, "FlexStar's Family of Products," http://www.flexstar.com, 1 page (1999).

Frankovich, "The Basics of Vibration Isolation Using Elastomeric Materials", EARSC, 2005 http://www.isoloss.com/pdfs/engineering/BasicsofVibrationIsolation.pdf.

Grochowski et al., "Future Trends in Hard Disk Drives" IEEE Transactions on Magnetics, vol. 32, No. 3, pp. 1850-1854, May 1996 http://svn.tribler.org/abc/branches/leo/dataset/preferences/johan/johan-68.pdf.

Gurumurthi et al., "Disk Drive Roadmap from the Thermal Perspective: A Case for Dynamic Thermal Management", International Symposium on Computer Architecture, Proceedings of the 32$^{nd}$ Annual International Symposium on Computer Architecture, IEEE Computer Society, pp. 38-49, 2005 http://portal.acm.org/citation.cfm?id=1069807.1069975.

Gurumurthi, "The Need for temperature-Aware Storage Systems", The Tenth Intersociety conference on Thermal and Thermomechanical Phenomena in Electronics, ITHERM pp. 387-394, 2006.

Gurumurthi et al., "Thermal Issues in Disk Drive Design: Challenges and Possible Solutions", ACM Transactions on Storage 2:41-73, Feb. 2006.

Haddad et al., "A new Mounting Adapter for Computer Peripherals with Improved Reliability, Thermal Distribution, Low Noise and Vibration Reduction", ISPS, Advances in Information Storage and Processing Systems, 1:97-108, 1995.

Henderson, "HAD High Aerial Densities Require Solid Test Fixtures", Flexstar Technology.

HighBeam Research website "ACT debuts six-zone catalytic gas heater. (American Catalytic Technologies offers new heaters)" www.highbeam.com, 4 pages, 1998.

HighBeam Research website "Asynchronous Testing Increases Throughput." www.highbeam.com, 7 pages, 2000.

HighBeam Research website "Credence announces Production Release of the EPRO AQ Series for Integrated Test and Back-end Processing." www.highbeam.com, 4 pages, 1995.

HighBeam Research website "Test Multiple Parts At Once for Air Leaks. (Brief Article)", www.highbeam.com, 1 page, 1999.

Iwamiya, "Hard Drive Cooling Using a Thermoelectric Cooler", EEP—vol. 19-2, Advances in Electronic Packaging, vol. 2:2203-2208, ASME 1997.

Johnson et al., "Performance Measurements of Tertiary Storage Devices", Proceedings of the $24^{th}$ VLDB Conference, New York, pp. 50-61, 1998.

Ku, "Investigation of Hydrodynamic Bearing Friction in Data Storage information System Spindle Motors", ISPSvol. 1, Advances in Information Storage and Processing Systems, pp. 159-165, ASME 1995.

Lindner, "Disk drive mounting", IBM Technical Disclosure Brochure, vol. 16, No. 3, pp. 903-904, Aug. 1973.

McAuley, "Recursive Time Trapping for Synchronization of Product and CHAMBER Profiles for Stress Test", Delphion, www.delphion.com/tdbs/tdb?order=88A+60957, 3 pages, Mar. 18, 2009.

Morgenstern, Micropolis Drives Target High-end Apps; Technology Provides Higher Uninterrupted Data Transfer. (Applications; Microdisk AV LS 3020 and 1050AV and 1760AV LT Stackable Hard Drive Systems) (Product Announcement) MacWeek, vol. 8, No. 6, p. 8; Feb. 7, 1994.

Morris, "Zero Cost Power and Cooling Monitor System", www.delphion.com/tdbs/tdb?order=94A+61950, 3 pages, Jan. 15, 2008.

Nagarajan, "Survey of Cleaning and cleanliness Measurement in Disk Drive Manufacture", North Carolina Department of Environment and Natural Resources, Feb. 1997.

Notification of Transmittal of The International Search Report and the Written Opinion of the International Searching Authority, or the Declaration, PCT/US2008/086181, 15 pages, Mar. 16, 2009.

Park, "Vibration and Noise Reduction of an Optical Disk Drive by Using a Vibration Absorber Methods and Apparatus for Securing Disk Drives in a Disk", IEEE Transactions on Consumer Electronics, vol. 48, Nov. 2002.

Prater et al., "Thermal and Heat-Flow Aspects of Actuators for Hard Disk Drives", InterSociety Conference on Thermal Phenomena, pp. 261-268, 1994.

Ruwart et al., "Performance Impact of External Vibration on Consumer-grade and enterprise-class Disk Drives", Proceedings of the $22^{nd}$ IEEE/$13^{th}$ Goddard Conference on Mass Storage Systems and Technologies, 2005.

Seagate Product Marketing, "Seagate's Advanced Multidrive System (SAMS) Rotational Vibration Feature", Publication TP-229D, Feb. 2000.

Schroeder et al., "Disk Failures in the Real World: What does an MTTP of 1,000,000 hours mean to you?", In FAST'07: $5^{th}$ USENIX Conference on File and Storage Technologies, San Jose, CA, Feb. 14-16, 2007.

Schulze et al., "How Reliable is a Raid?," COMPCON Spring apos; 89. Thirty-Fouth IEEE Computer Society International Conference: Intellectual Leverage, Digest of papers; pp. 118-123, Feb. 27-Mar. 3, 1989.

Terwiesch et al., "An Exploratory Study of International Product Transfer and Production Ramp-Up in the Data Storage Industry", The Information Storage Industry Center, University of California, www-irps.ucsd.edu/~sloan/, pp. 1-31, 1999.

Tzeng, "Dynamic Torque Characteriestics of Disk-Drive Spindle Bearings", ISPS—vol. 1, Advances in Information Storage and Processing Systems, pp. 57-63, ASME 1995.

Tzeng, "Measurements of Transient Thermal Strains in a Disk-Drive Actuator", Intersociety conference on Thermal Phenomena, pp. 269-274, 1994.

Wilson-7000 disk Drive Analyzer Product Literature, date accessed Jan. 28, 2009, 2 pages.

Winchester, "Automation Specialists Use Machine Vision as a System Development Tool", IEE Computing & Control Engineering, Jun./Jul. 2003.

Xyratex website "Storage Infrastructure" www.xyratex.com/Products/storage-infrastructure/default.aspx 1995-2008.

Xyratex website "Production Test Systems" www.xyratex.com/Products/production-test-systems/default.aspx 1995-2008.

Xyratex website "Single cell—Production Test Systems" www.xyratex.com/products/production-test-systems/single-cell.aspx 1995-2008.

Xyratex website "Continuous Innovation—Production Test Systems" www.xyratex.com/products/production-test-systems/continuous-innovation.aspx 1995-2008.

Xyratex website "Key Advantages—Production Test Systems" www.xyratex.com/products/production-test-systems/advantages.aspx 1995-2008.

Xyratex website "Testing Drives Colder—Production Test Systems" www.xyratex.com/products/productino-test-systems/colder.aspx 1995-2008.

"Xyratex to Debut its New Automated Test Solution for 2.5-Inch Disk Drives at DISKCON USA 2004" 2004 PR Newswire Europe www.prnewswire.co.uk/cgi/news/release?id=130103.

"Automated Production Test Solutions", Xyratex Product Test brochure, 2006.

Xyratex "Process Challenges in the Hard Drive Industry" slide presentation, 2006 Asian Diskcon.

Suwa et al., "Evaluation System for Residual Vibration from HDD Mounting Mechanism" IEEE Transactions on Magnetics, vol. 35, No. 2, pp. 868-873, Mar. 1999.

Suwa et al., "Rotational Vibration Suppressor" IBM Technical Disclosure Bulletin Oct. 1991.

Yee Leong Low et al., "Thermal network model for temperature prediction in hard disk drive" Journal Microsystem Technologies, vol. 15, No. 10-11, pp. 1653-1656, Oct. 2009 http://www.springerlink.com/content/20668jn67pk426r5/.

Annex to Form PCT/ASA/206 Communication Relating to the Results of the Partial International Search, for International Application No. PCT/US2008/086814, dated Apr. 3, 2009, 5 pages.

Annex to Form PCT/ASA/206 Communication Relating to the Results of the Partial International Search, for International Application No. PCT/US2008/086809, dated Apr. 3, 2009, 1 page.

Notification of Transmittal of the International Search Report and the Written Opinion of the International Searching Authority, or the Declaration, for International Application No. PCT/US2009/039926, Sep. 1, 2009, 13 pages.

Notification of Transmittal of the International Search Report and the Written Opinion of the International Searching Authority, or the Declaration, for International Application No. PCT/US2009/039591, Aug. 31, 2009, 10 pages.

Notification of Transmittal of the International Search Report and the Written Opinion of the International Searching Authority, or the Declaration, for International Application No. PCT/US2008/086814, Sep. 18, 2009, 17 pages.

Notification of Transmittal of the International Search Report and the Written Opinion of the International Searching Authority, or the Declaration, for International Application No. PCT/US2009/039888, Sep. 28, 2009, 13 pages.

Notification of Transmittal of the International Search Report and the Written Opinion of the International Searching Authority, or the Declaration, for International Application No. PCT/US2009/039921, Sep. 25, 2009, 14 pages.

Notification of Transmittal of the International Search Report and the Written Opinion of the International Searching Authority, or the Declaration, for International Application No. PCT/US2009/040058, Sep. 29, 2009, 13 pages.

Notification of Transmittal of the International Search Report and the Written Opinion of the International Searching Authority, or the Declaration, for International Application No. PCT/US2009/040829, Oct. 28, 2009, 13 pages.

Notification of Transmittal of the International Search Report and the Written Opinion of the International Searching Authority, or the Declaration, for International Application No. PCT/US2009/039590, Oct. 30, 2009, 10 pages.

Notification of Transmittal of the International Search Report and the Written Opinion of the International Searching Authority, or the Declaration, for International Application No. PCT/US2009/040835, Oct. 30, 2009, 13 pages.

Notification of Transmittal of the International Search Report and the Written Opinion of the International Searching Authority, or the Declaration, for International Application No. PCT/US2009/040757, Nov. 24, 2009, 12 pages.

Notification of Transmittal of the International Search Report and the Written Opinion of the International Searching Authority, or the Declaration, for International Application No. PCT/US2009/039898, Nov. 24, 2009, 12 pages.

Notification of Transmittal of the International Search Report and the Written Opinion of the International Searching Authority, or the Declaration, for International Application No. PCT/US2009/040795, Nov. 26, 2009, 13 pages.

Notification of Transmittal of the International Search Report and the Written Opinion of the International Searching Authority, or the Declaration, for International Application No. PCT/US2009/045583, Nov. 27, 2009, 13 pages.

Notification of Transmittal of the International Search Report and the Written Opinion of the International Searching Authority, or the Declaration, for International Application No. PCT/US2009/040888, Dec. 29, 2009, 14 pages.

Notification of Transmittal of the International Search Report and the Written Opinion of the International Searching Authority, or the Declaration, for International Application No. PCT/US2009/040894, Dec. 22, 2009, 12 pages.

Notification of Transmittal of the International Search Report and the Written Opinion of the International Searching Authority, or the Declaration, for International Application No. PCT/US2009/039934, Dec. 23, 2009, 12 pages.

Notification of Transmittal of the International Search Report and the Written Opinion of the International Searching Authority, or the Declaration, for International Application No. PCT/US2009/040965, Dec. 23, 2009, 12 pages.

Notification of Transmittal of the International Search Report and the Written Opinion of the International Searching Authority, or the Declaration, for International Application No. PCT/US2009/040973, Jan. 11, 2010, 13 pages.

Cardinal Intellectual Property's search report including the results of a search for the features of the claims included in the U.S. patent application entitled "Transferring Disk Drives Within Disk Drive Testing Systems", inventors: Polyakov et al, and having assigned Ser. No. . The foregoing U.S. patent application is a continuation of U.S. Appl. No. 12/104,536.

Cardinal Intellectual Property's search report including the results of a search for the features of the claims included in the U.S. patent application entitled "Transferring Storage Devices Within Storage Device Testing Systems", inventors: John P. Toscano et al., and having assigned Ser. No. . The foregoing U.S. patent application is a continuation of U.S. Appl. No. 12/424,980.

Cardinal Intellectual Property's search report including the results of a search for the features of the claims included in the U.S. patent application entitled "Processing Storage Devices", inventors: Richard W. Slocum III., and having assigned Ser. No. . The foregoing U.S. patent application is a continuation of U.S. Appl. No. 12/474,388.

Cardinal Intellectual Property's search report including the results of a search for the features of the claims included in the U.S. patent application entitled "Bulk Feeding Disk Drives To Disk Drive Testing Systems", inventors: Noble et al., and having assigned Ser. No. . The foregoing U.S. patent application is a continuation of U.S. Appl. No. 12/104,869.

Cardinal Intellectual Property's search report including the results of a search for the features of the claims included in the U.S. patent application entitled "Dependent Temperature Control Within Disk Drive Testing Systems", inventors: Merrow et al., and having assigned Ser. No. . The foregoing U.S. patent application is a continuation of U.S. Appl. No. 12/105,069.

Cardinal Intellectual Property's search report including the results of a search for the features of the claims included in the U.S. patent application entitled "Test Slot Cooling System for a Storage Device Testing System", inventors: Merrow et al., and having assigned Ser. No. . The foregoing U.S. patent application is a continuation of U.S. Appl. No. 12/503,567.

Cardinal Intellectual Property's search report including the results of a search for the features of the claims included in the U.S. patent application entitled "Storage Device Testing System Cooling", inventors: Brian S. Merrow and having assigned Ser. No. . The foregoing U.S. patent application is a continuation of U.S. Appl. No. 12/698,575.

Cardinal Intellectual Property's search report including the results of a search for the features of the claims included in the U.S. patent application entitled "Conductive Heating", inventors: Brian S. Merrow et al., and having assigned Ser. No. . The foregoing U.S. patent application is a continuation of U.S. Appl. No. 12/503,593.

Cardinal Intellectual Property's search report including the results of a search for the features of the claims included in the U.S. patent application entitled "Conductive Temperature Sensing", inventors: Brian S. Merrow et al., and having assigned Ser. No. . The foregoing U.S. patent application is a continuation of U.S. Appl. No. 12/503,687.

Cardinal Intellectual Property's search report including the results of a search for the features of the claims included in the U.S. patent application entitled "Solid State Temperature Control of Hard Drive Tester", inventors: Brian S. Merrow and having assigned Ser. No. . The foregoing U.S. patent application is a continuation of U.S. Appl. No. 12/105,103.

Cardinal Intellectual Property's search report including the results of a search for the features of the claims included in the U.S. patent application entitled "Single Test Slot for Dynamic Isolation of Hard Drive", inventors: Brian S. Merrow and having assigned Ser. No. . The foregoing U.S. patent application is a continuation of U.S. Appl. No. 12/105,105.

Cardinal Intellectual Property's search report including the results of a search for the features of the claims included in the U.S. patent application entitled "Hard Drive Transport Sled", inventors: Brian S. Merrow et al., and having assigned Ser. No. . The foregoing U.S. patent application is a continuation of U.S. Appl. No. 12/959,133.

Cardinal Intellectual Property's search report including the results of a search for the features of the claims included in the U.S. patent application entitled "Chilled Water Temp Control of Disk Drive Tester", inventors: Brian S. Merrow and having assigned Ser. No. . The foregoing U.S. patent application is a continuation of U.S. Appl. No. 12/105,061.

Cardinal Intellectual Property's search report including the results of a search for the features of the claims included in the U.S. patent application entitled "Processing Storage Devices", inventors: Richard W. Slocum III, and having assigned Ser. No. . The foregoing U.S. patent application is a continuation of U.S. Appl. No. 12/474,388.

Cardinal Intellectual Property's search report including the results of a search for the features of the claims included in the U.S. patent application entitled "Vibration Isolation Within Disk Drive Testing Systems," inventors: Brian S. Merrow and having assigned U.S. Appl. No. 12/767,142. The foregoing U.S. patent application is a continuation of U.S. Appl. No. 12/105,105. Revised as of Mar. 30, 2010.

Cardinal Intellectual Property's search report including the results of a search for the features of the claims included in the U.S. patent application entitled "Disk Drive Clamping Transport and Testing," inventors: Brian S. Merrow et al., and having assigned U.S. Appl. No. 12/767,113. The foregoing U.S. patent application is a continuation of U.S. Appl. No. 11/959,133.

Cardinal Intellectual Property's search report including the results of a search for the features of the claims included in the U.S. patent application entitled "Disk Drive Clamping Transport and Testing," inventors: Brian S. Merrow et al., and having assigned U.S. Appl. No. 12/766,680. The foregoing U.S. patent application is a continuation of U.S. Appl. No. 11/959,133. Revised as of Apr. 1, 2010.

Cardinal Intellectual Property's search report including the results of a search for the features of the claims included in the U.S. patent application entitled "Processing Storage Devices", inventors: Richard W. Slocum III, and having assigned U.S. Appl. No. 12/727,619. The foregoing U.S. patent application is a continuation of U.S. Appl. No. 12/474,388. Revised as of Jan. 5, 2009.

Exhibit 1 in *Xyratex Technology, LTD* v. *Teradyne, Inc.*; Newspaper picture that displays the CSO tester; 1990.

Exhibit 2 in *Xyratex Technology, LTD* v. *Teradyne, Inc.*; Photos of the CSO tester obtained from Hitachi; 1990.

Exhibit 1326 in *Xyratex Technology, LTD* v. *Teradyne, Inc.*; Image of the back of Exhibit 1 and Exhibit 2 photos, which display the photos' dates; 1990.

Exhibit 1314 in *Xyratex Technology, LTD*. V. *Teradyne, Inc.*; Case, "Last products of Disk-File Development at Hursley and Millbrook," IBM, Oct. 12, 1990.

Exhibit 1315 in *Xyratex Technology, LTD*. V. *Teradyne, Inc.*; Case, "History of Disk-File Development at Hursley and Millbrook," IBM, Oct. 17, 1990.

*Xyratex Technology, LTD*. V. *Teradyne, Inc.*, Teradyne, Inc's Prior Art Notice Pursuant to 35 U.S.C. Section 282. Case No. CV 08-04545 SJO (PLAx), Oct. 16, 2009.

*Xyratex Technology, LTD*. V. *Teradyne, Inc.*, Amended Joint Trial Exhibit List of Xyratex and Teradyne. Case No. CV 08-04545 SJO (PLAx), Nov. 12, 2009.

Notification of Transmittal of the International Search Report and the Written Opinion of the International Searching Authority, or the Declaration, for International Application No. PCT/GB2005/003490, Jan. 26, 2006, 10 pages.

FlexStar Technology, 30E/Cascade Users Manual, Doc #98-36387-00 Rev. 1.8, pp. 1-33, Jun. 1, 2004.

Henderson, "HAD High Aerial Densities Require Solid Test Fixtures", Flexstar Technology, Feb. 26, 2007.

Cardinal Intellectual Property's search report including the results of a search for the features of the claims included in the U.S. patent application entitled "Transferring Disk Drives Within Disk Drive Testing Systems", inventors: Polyakov et al, and having assigned U.S. Appl. No. 12/727,150. The foregoing U.S. patent application is a continuation of U.S. Appl. No. 12/104,536. Revised as of May 27, 2010.

PCT Notification Concerning Transmittal of International Preliminary Report on Patentability for corresponding International Application No. PCT/US2009/045583.

Cardinal Intellectual Property's search report including the results of a search for the features of the claims included in the U.S. patent application entitled "Transferring Storage Devices Within Storage Device Testing Systems", inventors: John, P. Toscano et al., and having assigned U.S. Appl. No. 12/727,201. The foregoing U.S. patent application is a continuation of U.S. Appl. No. 12/424,980. Revised as of Jan. 4, 2010.

Cardinal Intellectual Property's search report including the results of a search for the features of the claims included in the U.S. patent application entitled "Processing Storage Devices", inventors: Richard W. Slocum III., and having assigned U.S. Appl. No. 12/727,619. The foregoing U.S. patent application is a continuation of U.S. Appl. No. 12/474,388. Revised as of Jan. 5, 2010.

Cardinal Intellectual Property's search report including the results of a search for the features of the claims included in the U.S. patent application entitled "Bulk Feeding Disk Drives to Disk Drive Testing Systems", inventors: Noble et al., and having assigned U.S. Appl. No. 12/726,856. The foregoing U.S. patent application is a continuation of U.S. Appl. No. 12/104,869. Revised as of Jan. 15, 2010.

Cardinal Intellectual Property's search report including the results of a search for the features of the claims included in the U.S. patent application entitled "Dependent Temperature Control Within Disk Drive Testing Systems", inventors: Merrow et al., and having assigned U.S. Appl. No. 12/727,207. The foregoing U.S. patent application is a continuation of U.S. Appl. No. 12/105,069. Revised as of Jan. 13, 2010.

Cardinal Intellectual Property's search report including the results of a search for the features of the claims included in the U.S. patent application entitled "Test Slot Cooling System for a Storage Device Testing System", inventors: Merrow et al., and having assigned U.S. Appl. No. 12/727,700. The foregoing U.S. patent application is a continuation of U.S. Appl. No. 12/503,567. Revised as of Jan. 13, 2010.

Cardinal Intellectual Property's search report including the results of a search for the features of the claims included in the U.S. patent application entitled "Storage Device Testing System Cooling", inventors: Brian S. Merrow and having assigned U.S. Appl. No. 12/775,560. The foregoing U.S. patent application is a continuation of U.S. Appl. No. 12/698,575. Revised as of Feb. 17, 2010.

Cardinal Intellectual Property's search report including the results of a search for the features of the claims included in the U.S. patent application entitled "Conductive Heating", inventors: Brian S. Merrow et al., and having assigned U.S. Appl. No. 12/760,164. The foregoing U.S. patent application is a continuation of U.S. Appl. No. 12/503,593. Revised as of Jan. 6, 2010.

Cardinal Intellectual Property's search report including the results of a search for the features of the claims included in the U.S. patent application entitled "Storage Device Temperature Sensing", inventors: Brian S. Merrow et al., and having assigned U.S. Appl. No. 12/760,305. The foregoing U.S. patent application is a continuation of U.S. Appl. No. 12/503,687. Revised as of Jan. 7, 2010.

Cardinal Intellectual Property's search report including the results of a search for features included in U.S. patent application entitled "Solid State Temperature Control of Hard Drive Tester", U.S. Appl. No. 12/105,103. Revised as of Jan. 14, 2010.

Cardinal Intellectual Property's search report including the results of a search for the features of the claims included in the U.S. patent application entitled "Vibration Isolation Within Disk Drive Testing Sytems", inventors: Brian S. Merrow and having assigned U.S. Appl. No. 12/767,142. The foregoing U.S. patent application is a continuation of U.S. Appl. No. 12/105,105. Revised as of Jan. 12, 2010.

Cardinal Intellectual Property's search report including the results of a search for the features of the claims included in the U.S. patent application entitled "Disk Drive Clamping Transport and Testing", inventors: Brian S. Merrow et al., and having assigned U.S. Appl. No. 12/766,680. The foregoing U.S. patent application is a continuation of U.S. Appl. No. 11/959,133. Revised as of Jan. 14, 2010.

Cardinal Intellectual Property's search report including the results of a search for the features of the claims included in the U.S. patent application entitled "Chilled Water Temp Control of Disk Drive Tester", inventors: Brian S. Merrow and having assigned U.S. Appl. No. 12/766,680. The foregoing U.S. patent application is a continuation of U.S. Appl. No. 12/105,061. Revised as of Feb. 18, 2010.

Cardinal Intellectual Property's search report including the results of a search for the features of the claims included in the U.S. patent application entitled "Disk Drive Clamping Transport and Testing", inventors: Brian S. Merrow et al., and having assigned U.S. Appl. No. 12/767,113. The foregoing U.S. patent application is a continuation of U.S. Appl. No. 11/959,133. Revised as of Apr. 4, 2010.

\* cited by examiner

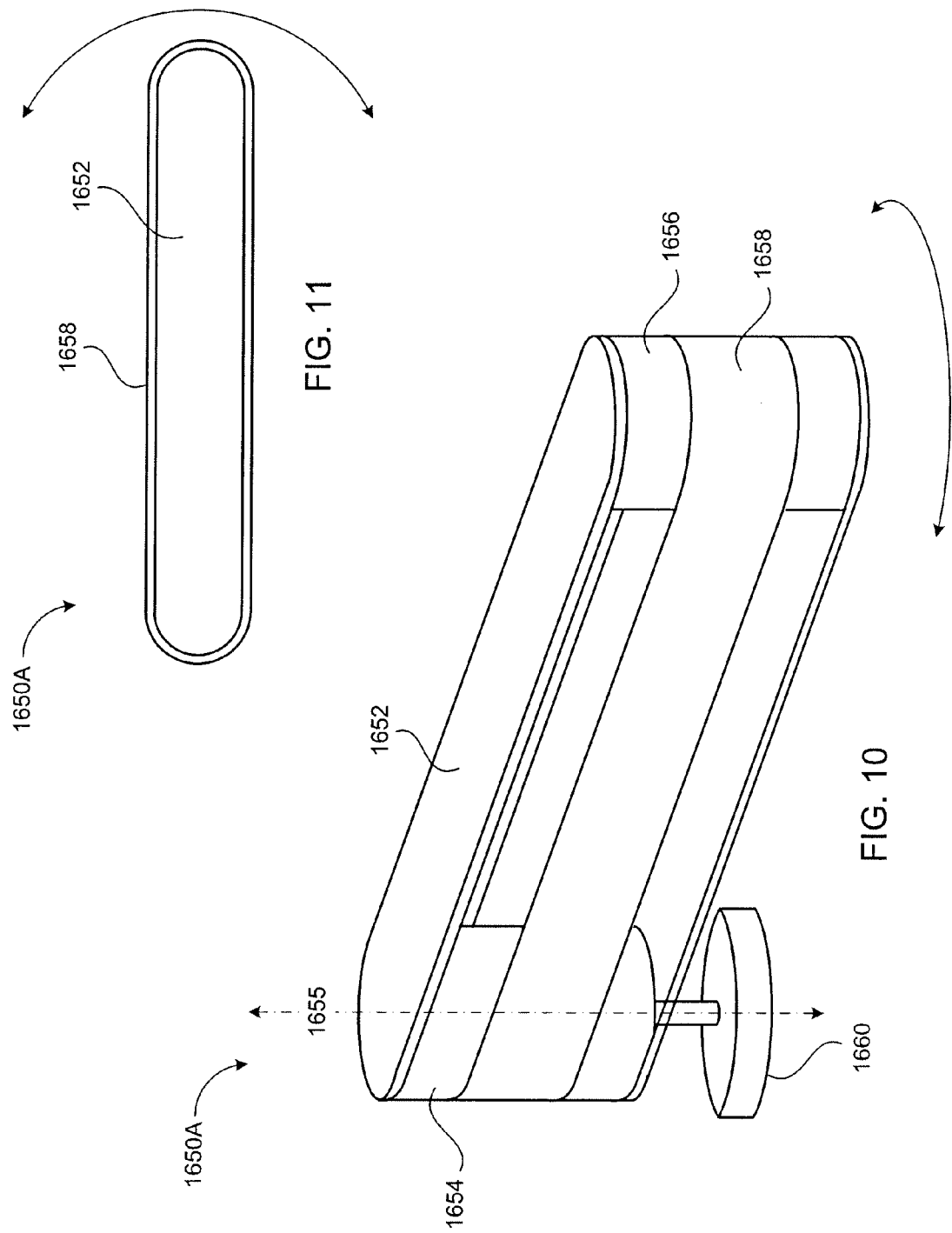

PROCESSING STORAGE DEVICES

CROSS REFERENCE TO RELATED APPLICATIONS

This application is a continuation and claims the benefit of priority under 35 U.S.C. §120 of U.S. application Ser. No. 12/474,388, filed May 29, 2009, which claims priority under 35 U.S.C. §119(e) to U.S. Provisional Application 61/058, 396, filed on Jun. 3, 2008. The disclosure of these prior applications are considered part of the disclosure of this application and are incorporated herein by reference in their entirety.

TECHNICAL FIELD

This disclosure relates to the processing of storage devices.

BACKGROUND

Disc drives are generally manufactured in mass volume. Final assembly of the disc drive's internal components into a case as typically seen by a consumer is usually performed in a clean room, with the associated circuit board(s) added as a final physical assembly step (except for application of any labels). After the final assembly, the disc drives are typically transferred to a disc drive testing system which performs a multitude of processing operations that may include testing, loading control software, and initial configuration of the disc drives. Much of the handling of disc drives within the testing system is robotic. As potentially-realizable intra-machine test times decrease, the physical speed limitations of robot movement prevent disc drive manufacturers from actually realizing these reduced processing times. In other words, advances in disc drive and data storage device testing allows shorter test times; however, the handling robots of many testing systems cannot handle (move) the data storage devices fast enough to allow the shorter test times to be realized in the overall throughput of the systems. Reduction of cost is an important element of electronics manufacture, and the inability to achieve lower test times due to mechanical limitations of the robotic components is a significant obstacle to continued manufacturing cost reduction. Traditionally, the data storage devices are manipulated by a robot and inserted into one or more individual process-operation sites. However, robot speed constraints and the required travel distances by the robots currently limit the overall throughput of the process machinery, whose individual-site process speed capabilities, as well as numbers, are increasing.

SUMMARY

High volume testing or processing of data storage devices in data storage device testing systems requires delivery of the data storage devices to test sites in sufficient volume so as to not adversely affect the overall processing throughput of the system. The present disclosure provides a storage device processing system that delivers the data storage devices to automated transporters (e.g., robots) in sufficient volume so as to relatively increase the throughput of testing the storage devices within the system.

One aspect of the disclosure provides a storage device processing system that includes at least one automated transporter, at least one rack accessible by the at least one automated transporter, and multiple test slots housed by the at least one rack. Each test slot is configured to receive a storage device for testing. The storage device processing system includes a conveyor arranged in a loop around and being accessible by the at least one automated transporter. The conveyor receives and transports the storage device thereon. The at least one automated transporter is configured to transfer the storage device between the conveyor and one of the test slots of the at least one rack.

Implementations of the disclosure may include one or more of the following features. In some implementations, the storage device processing system includes a controller in communication with the at least one automated transporter and the at least one rack. The controller is configured to control the at least one automated transporter and coordinate movement of the storage device within the storage device processing system. The storage device processing system may include an identification reader in communication with the controller and is configured to read an identifier on at least one of the storage device, a storage device transporter for transferring of the storage device by the at least one automated transporter, and a storage device fixture for receiving and carrying the storage device on the conveyor. The identification reader can be disposed on at least one of a manipulator disposed on the at least one automated transporter for transferring the storage device, a loading station for receiving the storage device onto the conveyor and an unloading station for removal of the storage device from the conveyor. In some examples, the controller stores in a memory a location of each storage device within the storage device processing system.

In some implementations, the conveyor comprises a storage device fixture for receiving and carrying the storage device on the conveyor. The storage device fixture may include an identifier for identification of the storage device fixture (e.g., by the identification reader). In some examples, the storage device fixture rotates on the conveyor to orient a longitudinal axis defined by the storage device fixture at an angle with respect to a conveying direction defined by the conveyor for interaction with the at least one automated transporter. The conveyor may include a loading station for receiving the storage device onto the conveyor and an unloading station for removal of the storage device from the conveyor.

The storage device processing system may include a guide system configured to support multiple automated transporters that move along the guide system to service test slots of the at least one rack. The at least one automated transporter defines a work zone encompassing multiple test slots of the at least one rack for servicing. The work zone of each automated transporter may be defined by an operating envelope of the respective automated transporter and/or by a controller in communication with the respective automated transporter.

Another aspect of the disclosure provides a storage device processing system that includes a first conveyor arranged in a loop and configured to receive and convey a storage device and at least one storage device processing module. The first conveyor has at least one on-way and at least one off-way for the ingress and egress of the storage device onto and off of the first conveyor. The at least one storage device processing module includes at least one automated transporter, at least one rack accessible by the at least one automated transporter, and multiple test slots housed by the at least one rack. Each test slot is configured to receive a storage device for testing. The storage device processing system includes a second conveyor arranged in a loop around and being accessible by the at least one automated transporter. The second conveyor receives and transports the storage device thereon. The at least one automated transporter is configured to transfer the storage device between the second conveyor and one of the test slots of the at least one rack. At least one on-way and at least one off-way connect the first conveyor to the second conveyor for movement of the storage device there between.

Implementations of the disclosure may include one or more of the following features. In some implementations, the first conveyor includes a diverter for directing the storage device off of the conveyor and onto the off-way and/or from the on-way onto the conveyor. In some examples, the diverter includes a diverter body, first and second rotating cylinders disposed on the diverter body, and a belt disposed on the first and second rotating cylinders. The first cylinder defines a longitudinal axis of rotation about which the diverter rotates to direct the storage device off of the conveyor. The belt is driven around the first and second rotating cylinders for directing the storage device off of the conveyor. In other examples, the diverter includes a first diverter body, first and second rotating cylinders disposed on the first diverter body, a first belt disposed on and being driven around the first and second rotating cylinders. The first cylinder defines a longitudinal axis of rotation about which the diverter rotates to direct the storage device off of the on-way and onto the conveyor. The diverter also includes a second diverter body coupled to the first diverter body, third and fourth rotating cylinders disposed on the second diverter body, and a second belt disposed on and being driven around the third and fourth rotating cylinders. The first and second diverter bodies a spaced to received the storage device between the first and second belts. In some implementations, the diverter includes a drive assembly for lifting and rotating the diverter and the received storage device between the first and second belts.

The storage device processing system may include a controller in communication with the at least one storage device processing module and the first conveyor. The controller coordinates movement of the storage device within the storage device processing system. In addition, each storage device processing module may include a controller in communication with the at least one automated transporter and the at least one rack. The controller is configured to control the at least one automated transporter and coordinate movement of the storage device within the storage device processing module. In some implementations, each storage device processing module includes an identification reader in communication with the controller and configured to read an identifier on at least one of the storage device, a storage device transporter for transferring of the storage device by the at least one automated transporter, and a storage device fixture for receiving and carrying the storage device on the second conveyor. The identification reader may be disposed on at least one of a manipulator disposed on the at least one automated transporter for transferring the storage device, a loading station for receiving the storage device onto the conveyor and an unloading station for removal of the storage device from the conveyor. In some examples, the controller stores in a memory a location of each storage device within the storage device processing module.

In some implementations, at least one of the first and second conveyors includes a storage device fixture for receiving and carrying the storage device on the respective conveyor. The storage device fixture may include an identifier for identification of the storage device fixture. In some examples, the storage device fixture rotates on the respective conveyor to orient a longitudinal axis defined by the storage device fixture at an angle with respect to a conveying direction defined by the respective conveyor. The second conveyor may include a loading station for receiving the storage device onto the second conveyor and an unloading station for removal of the storage device from the second conveyor.

The storage device processing system, in some examples, includes a guide system configured to support multiple automated transporters that move along the guide system to service test slots of the at least one rack. The at least one automated transporter defines a work zone encompassing multiple test slots of the at least one rack for servicing. The work zone of each automated transporter may be defined by an operating envelope of the respective automated transporter and/or by a controller in communication with the respective automated transporter.

Another aspect of the disclosure provides a method of transferring storage devices within a storage device processing system. The method includes receiving a storage device on a conveyor arranged in a loop around and being accessible by at least one automated transporter, actuating the at least one automated transporter to retrieve the storage device from the conveyor, and actuating the at least one automated transporter to deliver the retrieved storage device to a test slot of the storage device processing system and to insert the storage device in the test slot.

Implementations of the disclosure may include one or more of the following features. In some implementations, the method includes receiving the storage device on the conveyor at a loading station and removing the storage device from the conveyor at an unloading station. The method may include actuating the at least one automated transporter to retrieve the storage devices from the test slot and actuating the at least one automated transporter to deliver the retrieved storage device to the conveyor. In some implementations, the method includes reading an identifier on at least one of the storage device, a storage device transporter for transferring of the storage device by the at least one automated transporter, and a storage device fixture for receiving and carrying the storage device on the conveyor for tracking movement of the identifier within the processing system. The identifier may be read with an identification reader is disposed on at least one of a manipulator disposed on the at least one automated transporter for transferring the storage device, a loading station for receiving the storage device onto the conveyor and an unloading station for removal of the storage device from the conveyor.

The method may include receiving the storage device in a storage device fixture disposed on the conveyor. In some examples, the method includes rotating the storage device fixture on the conveyor to orient a longitudinal axis defined by the storage device fixture at an angle with respect to a conveying direction defined by the conveyor for interaction with the at least one automated transporter. The method may include determining a work zone of the at least one automated transporter, the work zone encompassing multiple test slots of the at least one rack for servicing by the at least one automated transporter.

Yet another aspect of the disclosure provides a method of transferring storage devices within a storage device processing system. The method includes receiving a storage device on a first conveyor arranged in a loop around one or more storage device processing modules, transporting the storage device received on the first conveyor to one of the storage device processing modules; and directing the storage device off of the first conveyor onto the off-way into the respective storage device processing module. Each storage device processing module includes at least one automated transporter, at least one rack accessible by the at least one automated transporter, multiple test slots housed by the at least one rack, each test slot being configured to receive the storage device for testing, and a second conveyor arranged in a loop around and being accessible by the at least one automated transporter, the second conveyor receiving and transporting the storage device thereon. The at least one automated transporter is configured to transfer the storage device between the second conveyor and one of the test slots of the at least one rack. At least one on-way and at least one off-way connect the first conveyor to the second conveyor for movement of the storage device there between.

Implementations of the disclosure may include one or more of the following features. In some implementations, the method includes actuating the at least one automated transporter to retrieve the received storage device from the second conveyor and actuating the at least one automated transporter to deliver the retrieved storage device to a test slot of the storage device processing module and to insert the storage device in the test slot. The method may include receiving the storage device on the second conveyor at a loading station and removing the storage device from the second conveyor at an unloading station. In some examples, the method includes actuating the at least one automated transporter to retrieve the storage devices from the test slot and actuating the at least one automated transporter to deliver the retrieved storage device to the second conveyor.

In some implementations, the method includes reading an identifier on at least one of the storage device, a storage device transporter for transferring of the storage device by the at least one automated transporter, and a storage device fixture for receiving and carrying the storage device on the conveyors for tracking movement of the identifier within the processing system. The identifier may be read with an identification reader disposed on at least one of a manipulator disposed on the at least one automated transporter for transferring the storage device, a loading station for receiving the storage device onto one of the conveyors and an unloading station for removal of the storage device from one of the conveyors.

In some implementations, the method includes receiving the storage device in a storage device fixture disposed on one of the conveyors. The method may include rotating the storage device fixture on the respective conveyor to orient a longitudinal axis defined by the storage device fixture at an angle with respect to a conveying direction defined by the respective conveyor. The method may include determining a work zone of the at least one automated transporter, the work zone encompassing multiple test slots of the at least one rack for servicing by the at least one automated transporter.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 10 is a perspective view of a diverter.

FIG. 11 is a top view of the diverter of FIG. 10.

Like reference symbols in the various drawings indicate like elements.

DETAILED DESCRIPTION

The present disclosure provides a data storage device processing system for transferring storage devices to and from testing equipment for testing. The use of conveyors in the arrangement disclosed providing increased through-put and efficiency of the storage device testing system, inter alia.

A storage device, as used herein, includes disk drives, solid state drives, memory devices, and any device that requires asynchronous testing for validation. A disk drives is generally a non-volatile storage device which stores digitally encoded data on rapidly rotating platters with magnetic surfaces. A solid-state drive (SSD) is a data storage device that uses solid-state memory to store persistent data. An SSD emulates a hard disk drive interface, thus easily replacing it in most applications. An SSD using SRAM or DRAM (instead of flash memory) is often called a RAM-drive. The term solid-state generally distinguishes solid-state electronics from electromechanical devices. With no moving parts, solid-state drives are less fragile than hard disks and are also silent (unless a cooling fan is used); as there are no mechanical delays, they usually employ low access time and latency.

Figure 1:
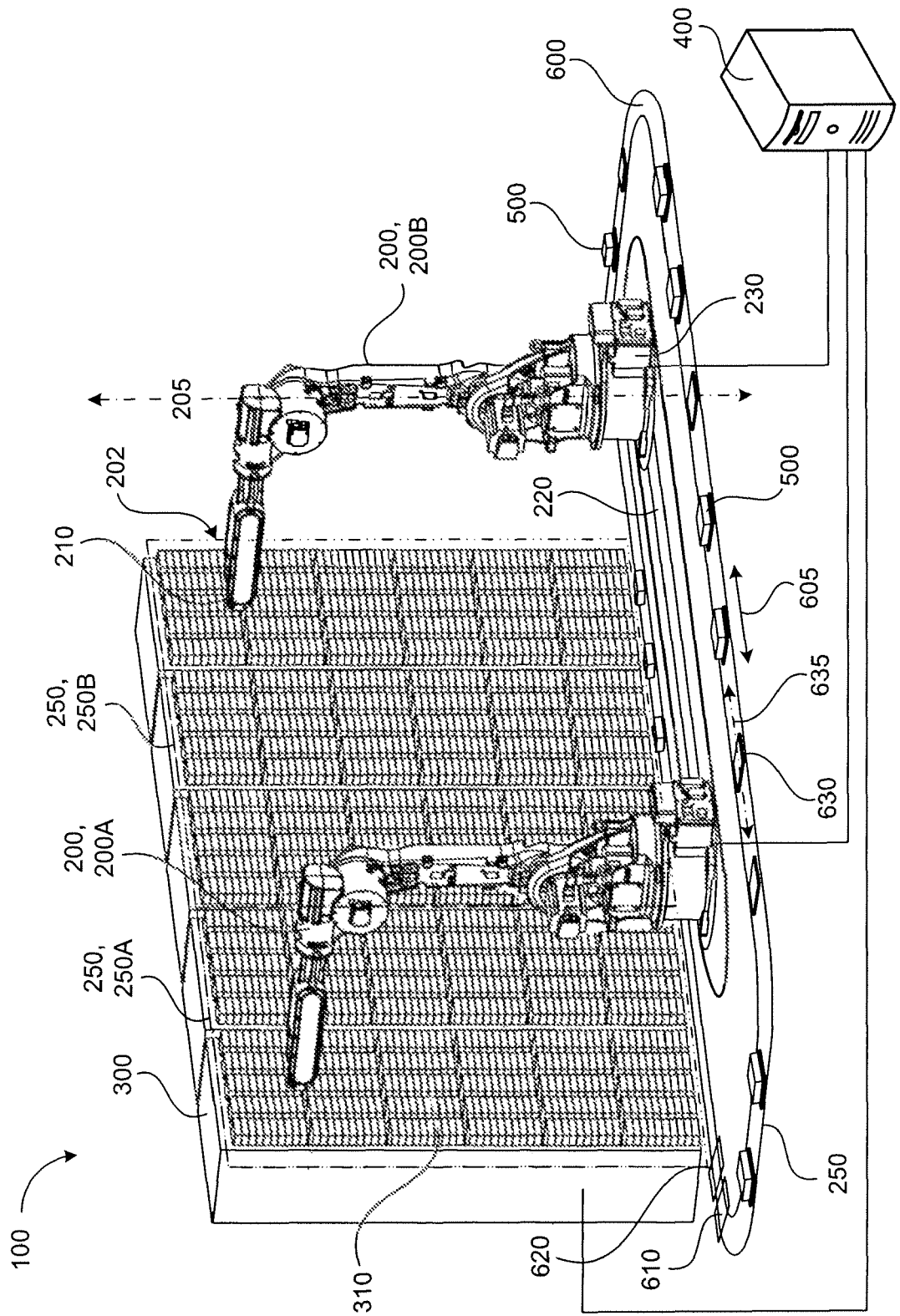
FIG. 1 is a perspective schematic view of a storage device processing system.
Figure 2:
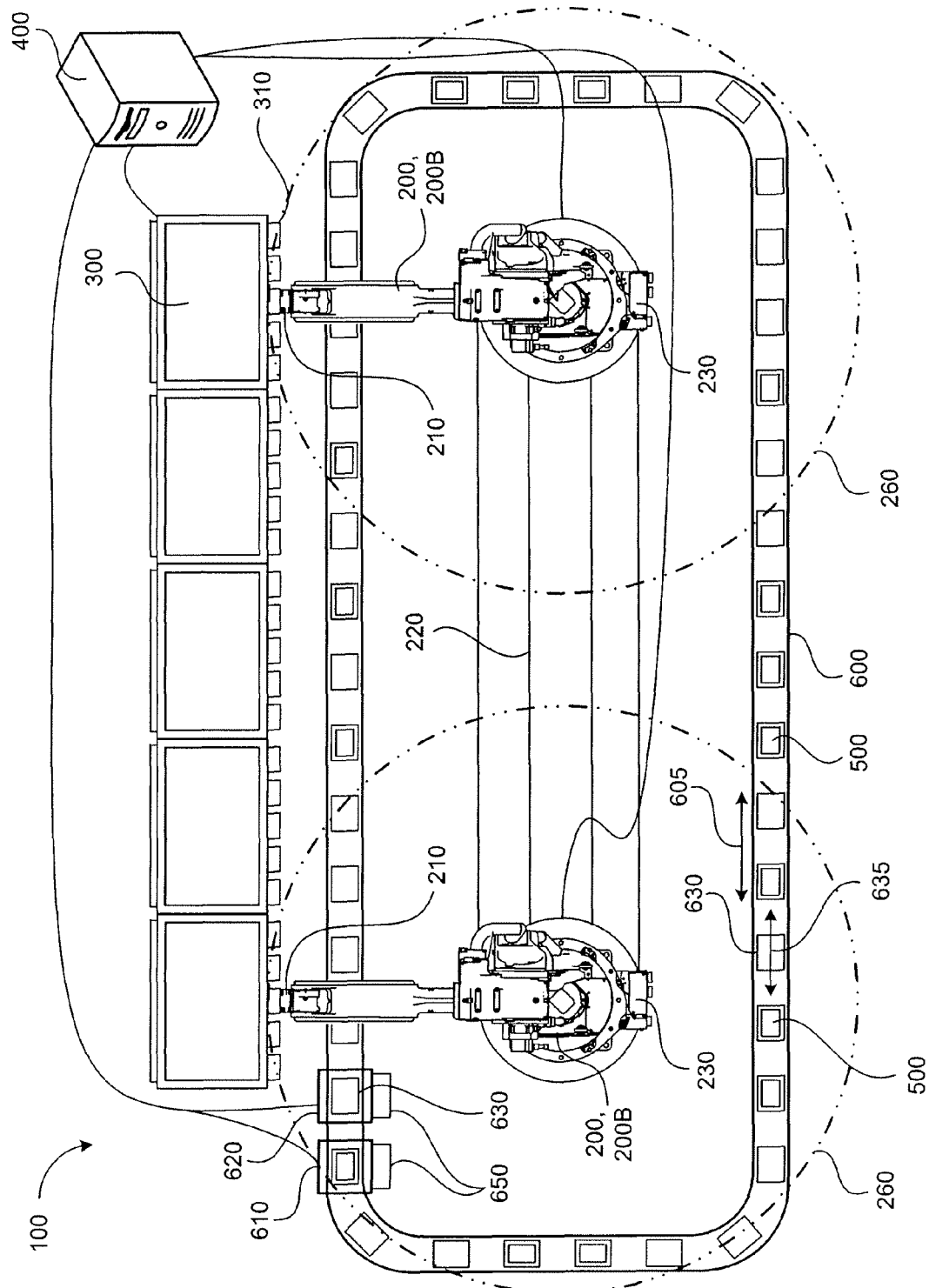
FIG. 2 is a top schematic view of a storage device processing system.

Referring to FIGS. 1-2, a storage device processing system 100 includes at least one automated transporter 200 (e.g., robotic arm, gantry system, or multi-axis linear actuator) disposed on a guide system 220. Multiple racks 300 are arranged substantially in a row for servicing by the robotic arm(s) 200. Each rack 300 houses multiple test slots 310 configured to receive storage devices 500 for testing (e.g., diagnostic, connectivity, and/or performance testing). A controller 400 (e.g., computing device) communicates with each automated transporter 200 and rack 300. The controller 400 coordinates servicing of the test slots 310 by the automated transporter(s) 200. For example, the controller 400 can execute programs or instructions communicated to it or stored in memory thereon for moving the automated transporters 200 along the guide system 220. The controller 400 tracks the movements of the automated transporters 200 and prevents collisions. The storage device processing system 100 includes a conveyor 600 configured to carry storage devices 500 between a loading station 610, an unloading station 620, and at least one automated transporter 200. In the example shown, the conveyor 600 is configured as a continuous loop around the automated transporter(s) 200 with the loading and unloading stations 610, 620 located adjacent each other.

In some implementations, the guide system 220 includes a linear actuator configured to move an associated automated transporter 200 adjacently along the racks 300 to allow the associated automated transporter 200 to service test slots 310 of more than one rack 300. In other implementations, each automated transporter 200 includes a drive system 230 configured to move the automated transporter 200 along the guide system 220. For example, the automated transporter 200 may be mounted on a rail system 220 and the drive system 230 moves the automated transporter 200 along the rail system 220. The guide system 220 may be scalable (e.g., in length) and may accommodate multiple automated transporter 200, for example, to support either longer racks 300 or to further reduce the area serviced by each automated transporter 200 to increase throughput and/or accommodate shorter testing times. In the examples shown, the automated transporter 200 is a robotic arm 200 operable to rotate through a predetermined arc about a longitudinal axis 205 defined by the robotic arm 200 and to extend radially from the first axis 205. The robotic arm 200 is operable to rotate 360° about the first axis 205 and includes a manipulator 210 disposed at a distal end 202 of the robotic arm 200 to handle one or more storage devices 500 and/or storage device transporters 550 that carry the storage devices 500 (see e.g. FIGS. 5-6). In some examples, the processing system 100 includes multiple guide systems 220 that each support one or more automated transporters 200. The automated transporters 200 on each guide system 220 may be instructed to service adjacent racks 300 and associated test slots 310.

In some implementations, the automated transporter 200 (e.g., robotic arm) is configured to independently service each test slot 310 to provide a continuous flow of storage devices 500 through the processing system 100. A continuous flow of individual storage devices 500 through the processing system 100 allows random start and stop times for each storage device 500. Therefore, with continuous flow, storage devices 500 of different capacities can be run at the same time and serviced (e.g., loaded/unloaded) as needed. In other implementations, the processing system 100 tests batches of storage devices 500 all at once, where an entire batch of loaded storage devices start and end at substantially the same time.

The processing system 100 overcomes mechanical speed constraints of the automated transporter 200 which limit overall testing throughput by the inclusion of multiple automated transporters 200 servicing the test slots 310. Each automated transporter 200 may be assigned a work zone 250 that includes a group of test slots 310 across one or more racks 300 for servicing by that automated transporter 200. Each automated transporter 200 may service a partial number of the overall number of test slots 310 that correspond to its assign work zone 250. The work zone 250 assigned to each automated transporter 200 may encompass only test slots 310 that receive certain types of storage devices 500 and/or to certain types of testing. In some examples, the work zone 250 includes test slots only within a certain area on the rack(s) 300 (e.g., directly adjacent the automated transporter 200, upper or lower regions of the rack 300, or optimized groupings of test slots 310 determined by the controller 400). The processing system 100 may be configured such that the work zones 250 designate preferred, rather than exclusive, test slots 310 for servicing by respective automated transporters 200. In some instances, the multiple work zones 250 overlap with each other, so that if one automated transporter 200 fails, adjacent automated transporters 200 can service the test slots 310 of the work zone 250 associated with the failed automated transporter 200. In the example shown, a first automated transporter 200A services a first work zone 250A and a second automated transporter 200B services a second works on 250B. Each work zone 250, 250A, 250B may be defined by the operating envelope 260 of the associated automated transporter 200, 200A, 200B (e.g., all of the test slots 310 accessible by the manipulator 210 of the associated automated transporter 200, 200A, 200B). The conveyor 600 may be arranged to pass through one or more work zones 250, thereby providing associated automated transporters 200 access to conveyed storage devices 500.

The usage of conveyors 600 in the processing system 100 eliminates the need for each automated transporter 200 to travel to a loading station 610 or unloading station 620, which may be a distance away from its assigned works zone 250 to retrieve or deposit storage devices 500. The conveyor(s) 600 also allows for a single input/output location (e.g., via the loading and unloading stations 610, 620) for the processing system 100. Rather than traveling to and from a loading/unloading station, the conveyor 600 conveys storage devices 500 from the loading station 610 to an automated transporter 200 for delivery to a test slot 310 (e.g., for testing). After testing or servicing of the storage device 500 by the test slot 310, the storage device 500 is retrieved by one of the automated transporters 200 (e.g., by the manipulator 210) and returned to the conveyor 600, which returns the data storage device 500 to the unloading station 620. As a result, untested storage devices 500 are brought to the automated transporter 200 and the automated transporter deposits tested storage devices 500 onto the conveyor 600, while never leaving its works zone 250.

In some implementations, the conveyor 600 includes one or more storage device fixtures 630 configured to receive and/or hold a storage device 500 during conveyance by the conveyor 600. However, in other implementations, the conveyor(s) 600 do not include storage device fixtures 630 and instead, the storage devices 500 are placed directly onto and retrieved from the conveyor(s) 600. In the example shown, the conveyor 600 is arranged in a loop and includes storage device fixtures 630 spaced by a threshold distance (e.g., a distance that allows movement of the storage device fixtures 630 along a curved path without binding or collision). In some implementations, the storage device fixtures 630 can rotate (e.g., clockwise or counterclockwise) on the conveyor 600, so as to orient storage devices 500 in a particular orientation for servicing by an automated transporter 200. For example, the storage device fixture 630, defining a longitudinal axis 635, may orient its longitudinal axis 635 substantially parallel to a conveying direction 605 of the conveyor 600 during movement of the storage device 500, and then rotate to orient its longitudinal axis 635 at an angle to the conveying direction 605 for interaction with an automated transporter 200 (e.g., for retrieval and/or delivery of a storage device 500 from/to the storage device fixtures 630). The controller 400 may evaluate a preferred orientation of the storage device fixture 630 for servicing by a particular automated transporter 200.

Figure 3:
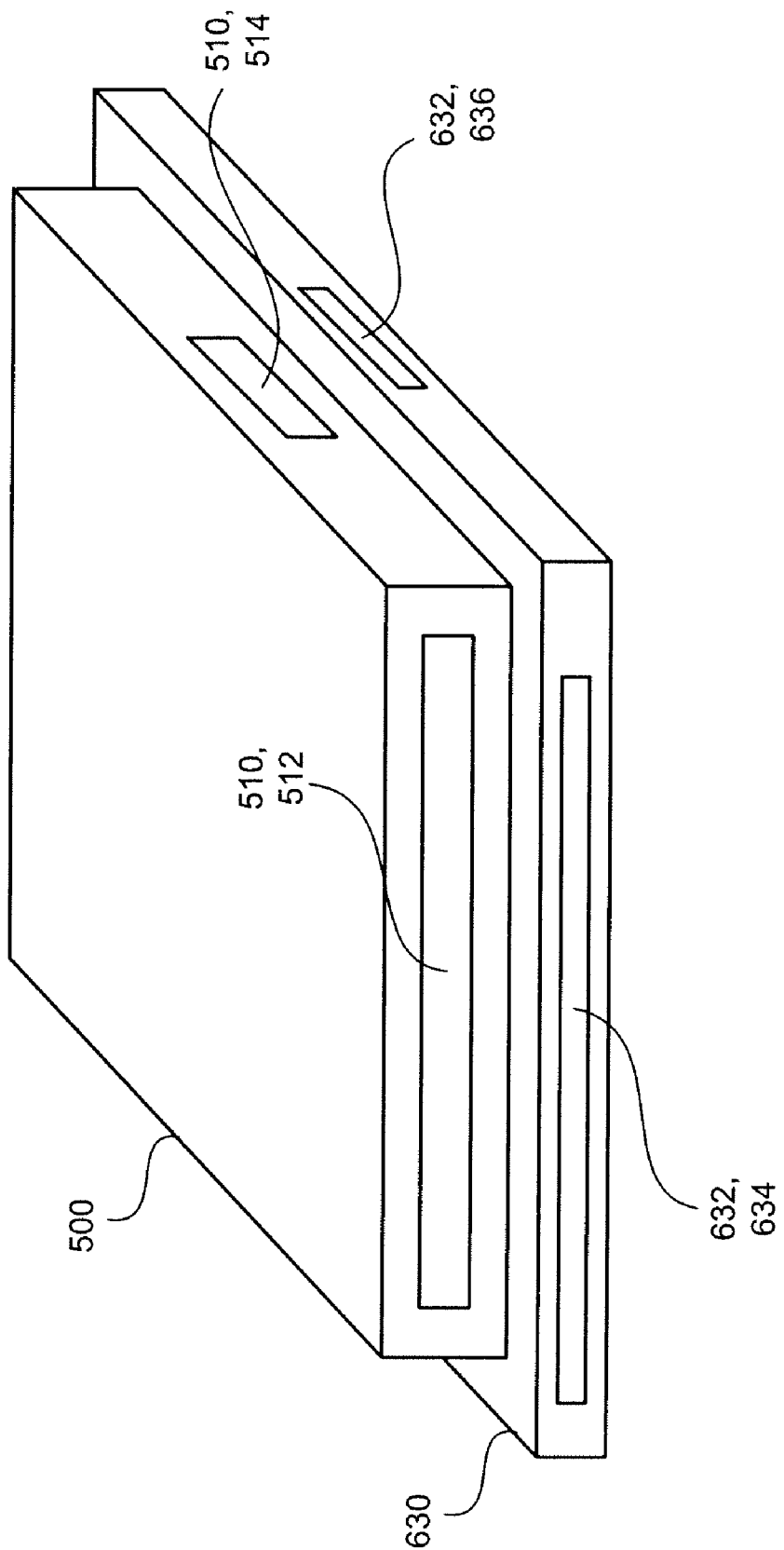
FIG. 3 is a perspective view of a storage device supported by a storage device fixture.
Figure 4:
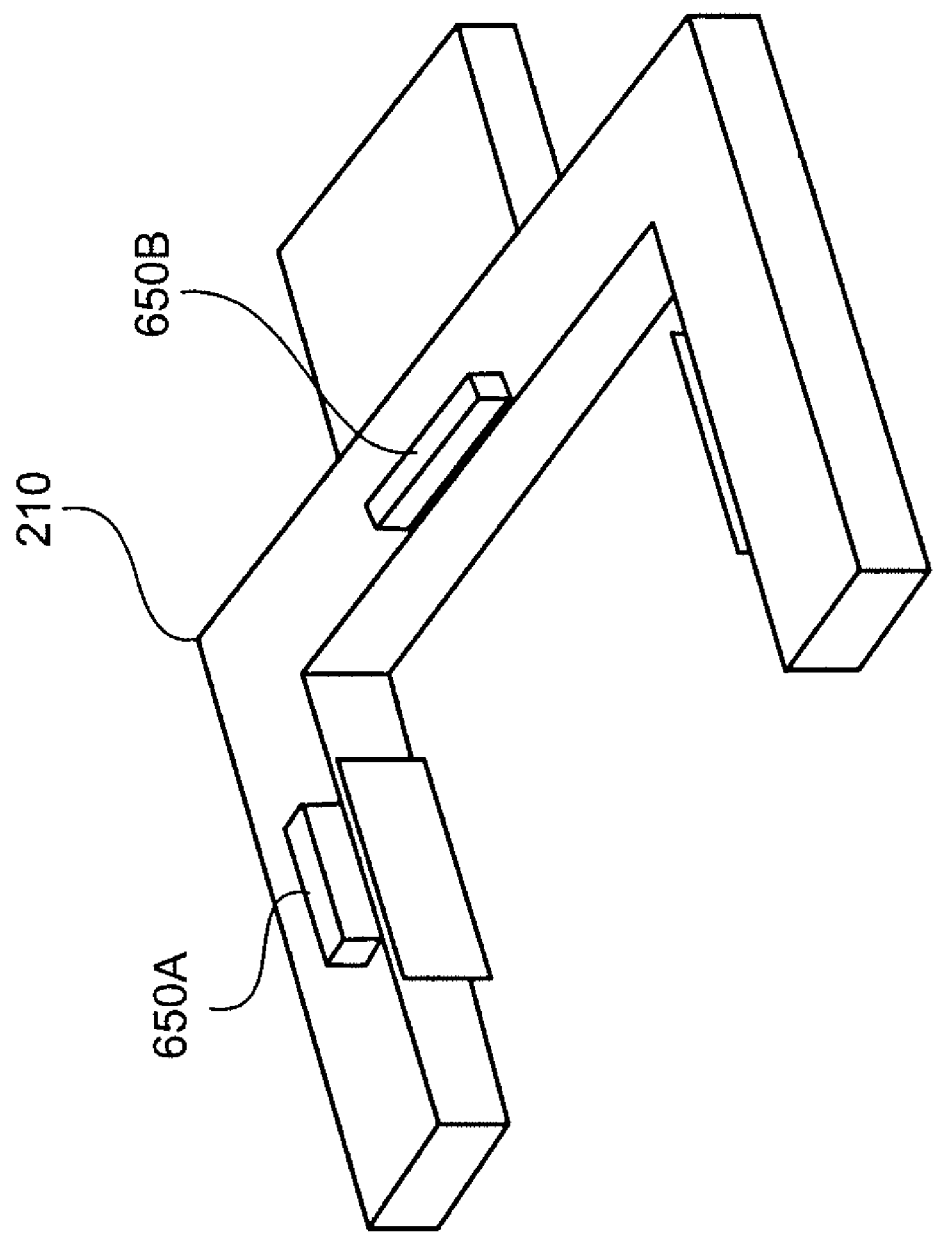
FIG. 4 is a perspective view of a manipulator with two identification readers.

Referring to FIGS. 2-3, in some implementations, each storage device fixture 630 includes an identifier 632, such as a barcode 634 and/or radiofrequency identification (RFID) tag 636, for tracking movement of the storage device fixtures 630 within the processing system 100. Similarly, each storage device 500 may include one or more identifiers 510 (e.g., barcode 512, radio frequency identification (RFID) tag 514, circuit board, color tag, symbol, etc.) for identification of the storage device 500 by the processing system 100. The processing system 100 may include an identification reader 650 (e.g., barcode reader, RFID sensor, etc.) configured to read the storage device fixture identifier 632 and/or storage device identifier 510. In some examples, the loading station 610 and/or the unloading stations 620 includes an identification reader 650. In the example shown in FIG. 4, the manipulator 210 includes one or more identification readers 650 (e.g., barcode reader 650A and RFID reader 650B) for reading any identifiers 510 (e.g., barcode 512 and radio frequency identification (RFID) tag 514) disposed on the storage devices 500. In some examples, the automated transporter 200 is configured to maneuver the manipulator 210 so as to read the storage device fixture identifier 632 with the identification readers 650 while retrieving and/or depositing a storage device 500 therein. The identification reader 650 may be in communication with the controller 400 (e.g., via the loading and unloading stations 610, 620 or the automated transporter 200) for tracking and/or directing movement of the storage device fixtures 630 and the storage devices 500 within the processing system 100. The controller 400 can maintain a log or memory of which storage devices 500 are carried by each storage device fixture 630 at every given moment. For example, the controller 400 determines a destination test slot 310 to receive an identified storage device 500 being conveyed in an identified storage device fixture 630 and instructs one of the automated transporters 200 to retrieve the identified storage device 500 from the associated identified storage device fixture 630 and deliver it to the destination test slot 310 for testing. The controller 400 may determine an optimized path of the identified storage device 500 within the processing system 100, as by selecting a particular automated transporter 200 to move the identified storage device 500 and a particular test slot 310 to receive the identified storage device 500 so as to minimize movement of the automated transporter 200 and therefore transporting time of the identified storage device 500. As the identified storage device fixture 630 travels within the operating envelope 260 of the identified automated transporter 200 having an associated work zone 250 covering the identified test slot 310, the controller 400 instructs the automated transporter 200 to retrieve the storage device 500 from the storage device fixture 630 and deliver it to the identified test slot 310 for testing. Similarly, after testing is complete on the storage device 500 by the test slot 310, the controller 400 can instruct one of the automated transporters 200 having a work zone 250 covering the test slot 310 to retrieve the storage device 500 from the test slot 310 and deliver the storage device 500 to one of the storage device fixtures 630 identified as empty on the conveyor 600. Once on the conveyor 600, the storage device 500 travels to the unloading station 620 for removal from the processing system 100

As each storage device fixture 630 passes (directly over, adjacently, or in the vicinity of) the loading and unloading stations 610, 620, a human operator or robotic system can service the storage device fixtures 630. Although the loading and unloading stations 610, 620 are shown as being located adjacent each other, they may be located separate from each other anywhere along the conveyor 600. Untested storage devices 500 can be loaded into storage device fixtures 630 at the loading station 610 and tested storage devices 500 can be unloaded from storage device fixtures 630 at the unloading station 620. In some examples, the storage device identifier 510 and the storage device fixture identifier 632 are read and communicated to the controller 400 upon loading and unloading of the respective storage device 500 to/from the associated storage device fixture 630. If any particular storage device 500 has not been removed from the conveyor 600 by the time it completes its journey around the conveyor loop (e.g., back to the loading and unloading stations 610, 620), it continues around the loop again, thereby allowing the controller 400 another opportunity to assign an automated transporter 200 to service the storage device 500. As a result, the conveyor 600 can operate on a continuous basis without regard for whether any particular storage device 500 has been loaded onto or removed from the conveyor 600. Similarly, if a particular test slot 310 required for testing a particular storage device 500 is in use, the identified storage device 500 may continue to loop around the conveyor 600 until the identified test slot 310 is empty/available for receipt of the storage device 500. In addition, the controller 400 may execute instructions to remove or otherwise process a storage device 500 that has resided on the conveyor 600 for a threshold time limit or number of loops. The conveyor 600 may act as a buffer for storage devices 500, were storage devices 500 can be loaded onto the conveyor 600 at a higher-rate than they can be removed by the automated transporter(s) 200 (e.g., for delivery to test slots 310).

Figure 5:
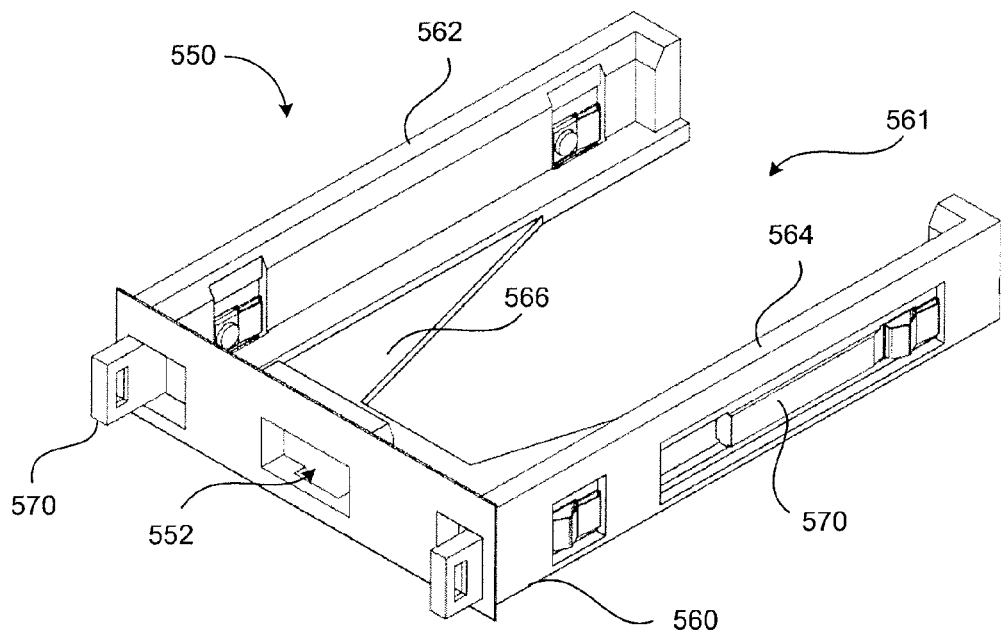
FIG. 5 is a top perspective view of a storage device transporter.
Figure 6:
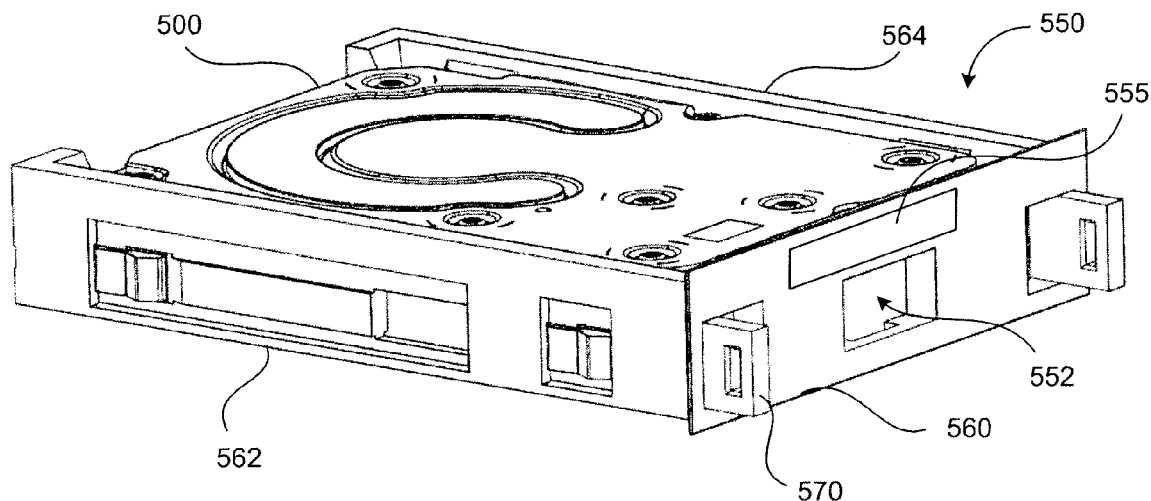
FIG. 6 is a top perspective view of a storage device transporter carrying a storage device.
Figure 7:
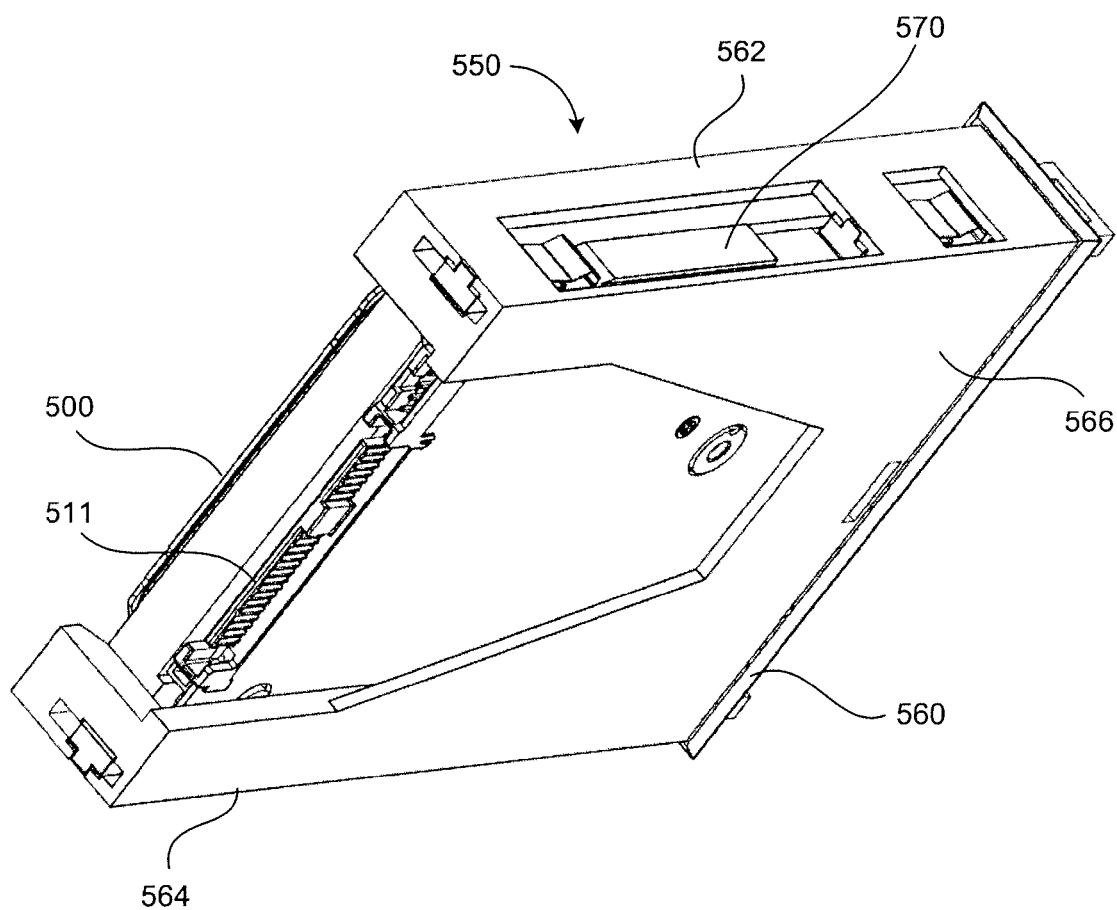
FIG. 7 is a bottom perspective view of a storage device transporter carrying a storage device.

Referring to FIGS. 5-7, in some examples, each test slot 310 is configured to receive the storage device transporter 550. The storage device transporter 550 is configured to receive the storage device 500 and be handled by the manipulator 210 of the automated transporter 200. In some implementations, each storage device fixture 630 comprises the storage device transporter 550, while in other implementations, the storage device fixture 630 is configured to receive the storage device transporter 550. In use, one of the storage device transporters 550 is removed from one of the test slots 310 by the automated transporter 200 (e.g., by grabbing, or otherwise engaging, the indentation 552 of the transporter 550 with the manipulator 210). As illustrated in FIG. 5, the storage device transporter 550 includes a frame 560 defining a substantially U-shaped opening 561 formed by sidewalls 562, 564 and a base plate 566 that collectively form the frame 560. With the storage device 500 received within the frame 560, the storage device transporter 550 and the storage device 500 together can be moved by the automated transporter 200 for placement within one of the test slots 310. The manipulator 210 is also configured to initiate actuation of a clamping mechanism 570 disposed in the storage device transporter 550. This allows actuation of the clamping mechanism 570 before the storage device transporter 550 is moved to and from the test slot 310 to inhibit movement of the storage device 500 relative to the storage device transporter 550 during the move. Prior to insertion in the test slot 310, the manipulator 210 can again actuate the clamping mechanism 570 to release the storage device 500 within the frame 560. This allows for insertion of the storage device transporter 550 into one of the test slots 310, until the storage device 500 is in a test position with a storage device connector 511 engaged with a test slot connector (not shown). The clamping mechanism 570 may also be configured to engage the test slot 310, once received therein, to inhibit movement of the storage device transporter 550 relative to the test slot 310. In such implementations, once the storage device 500 is in the test position, the clamping mechanism 570 is engaged again (e.g., by the manipulator 210) to inhibit movement of the storage device transporter 550 relative to the test slot 310. The clamping of the storage device transporter 550 in this manner can help to reduce vibrations during testing. In some examples, after insertion, the storage device transporter 550 and storage device 500 carried therein are both clamped or secured in combination or individually within the test slot 310. In some examples, the storage device transporter 550 includes an identifier 555 for identification of the storage device transporter 550 and/or the held storage device 500 by the identification reader 650. A detailed description of the clamping mechanism 570 and other details and features combinable with those described herein may be found in U.S. patent application Ser. No. 11/959,133, filed Dec. 18, 2007, the entire contents of the which are hereby incorporated by reference.

Some storage devices 500 can be sensitive to vibrations. Fitting multiple storage devices 500 in a single test rack 310 and running the storage devices 500 (e.g., during testing), as well as the insertion and removal of the storage device transporters 550, each optionally carrying a storage device 500, from the various test slots 310 in the test rack 300 can be sources of undesirable vibration. In some cases, for example, one of the storage devices 500 may be operating under test within one of the test slots 310, while others are being removed and inserted into adjacent test slots 310 in the same rack 300. Clamping the storage device transporter 550 to the test slot 310 after the storage device transporter 550 is fully inserted into the test slot 310 can help to reduce or limit vibrations by limiting the contact and scraping between the storage device transporters 550 and the test slots 310 during insertion and removal of the storage device transporters 550.

Figure 8:
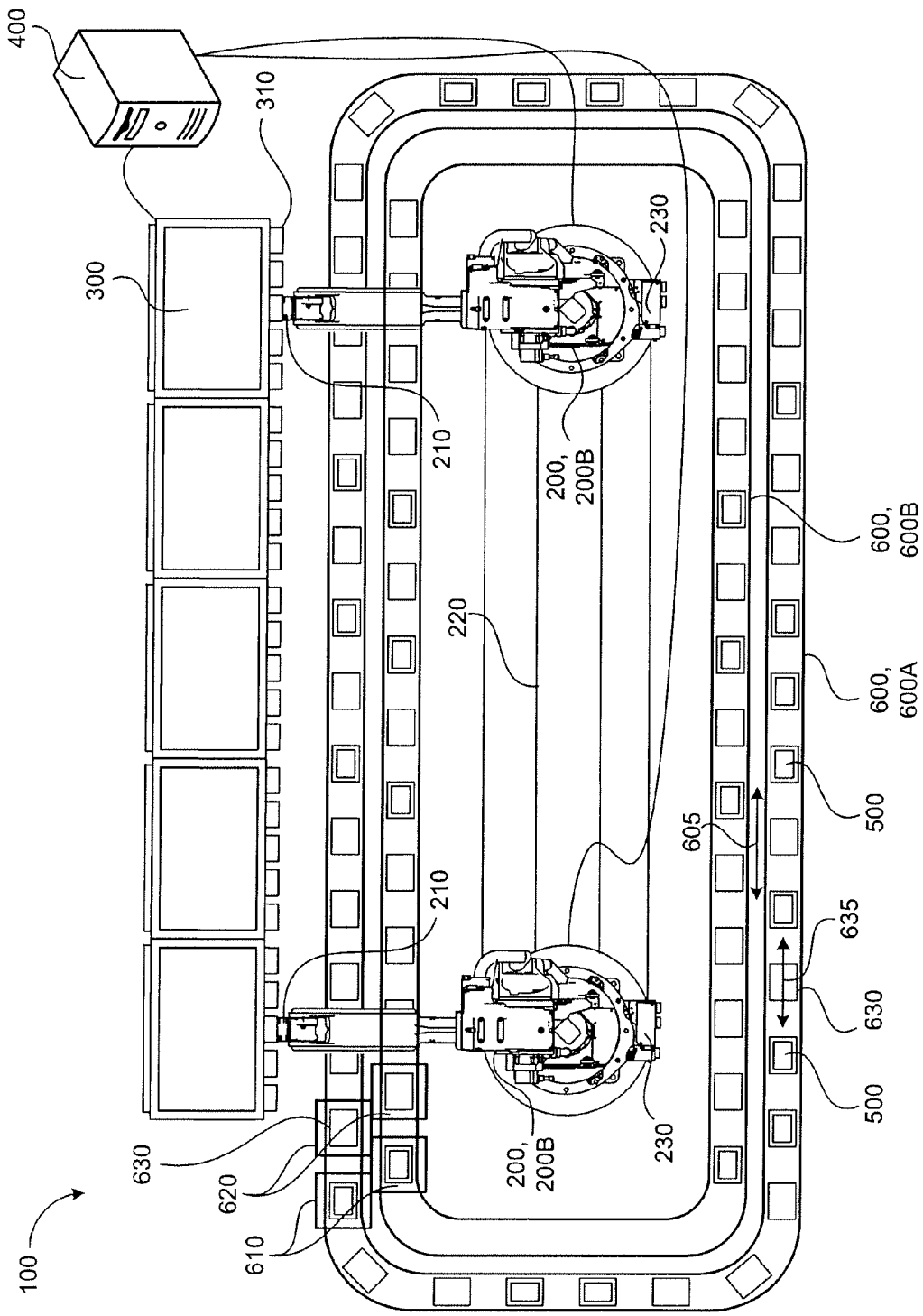
FIG. 8 is a top schematic view of a storage device processing system having multiple conveyors.

In some implementations, the processing system 100 includes multiple conveyors 600. In the example shown in FIG. 8, the processing system 100 includes first and second conveyors 600A, 600B. The first conveyor 600A may be used to transport untested storage devices 500 for delivery to test slots 310, while the second conveyor 600A may be used to transport tested storage devices 500 retrieved from test slots 310. In other examples, both conveyors 600A, 600B transport tested and untested storage devices 500. In additional examples, the first conveyor 600A may be used to transport one type of storage device 500, while the second conveyor 600A may be used to transport another type of storage device 500. Each conveyor 600, 600A, 600B can be operated at a speed and direction independent of any other conveyors 600 in the processing system 100. The controller 400 may direct the speed and direction of each conveyor 600 to optimize through-put of the processing system 100. Among possible arrangements, multiple conveyors 600 may be substantially coplanar and concentric, as shown in FIG. 8, stacked substantially above and below each other, vertically separated (e.g., with no restriction on lateral positioning with respect each other), or any other configuration for accommodating transportation of storage devices 500 to and from automated transporters 200. In some examples, the conveyor 600 reduces speed or stops near or at an automated transporter 200 to provide access to any carried storage devices 500. The conveyor 600 may speed up to a threshold speed during conveyance between another automated transporter 200 or one of the loading or unloading stations 610, 620. The controller 400 may be configured to control the speed of the conveyor 600 overall and/or along particular segments of the conveyor 600 and coordinate movement of the automated transporter(s) 200 to transport storage devices 500 to and from the conveyor 600.

Figure 9:
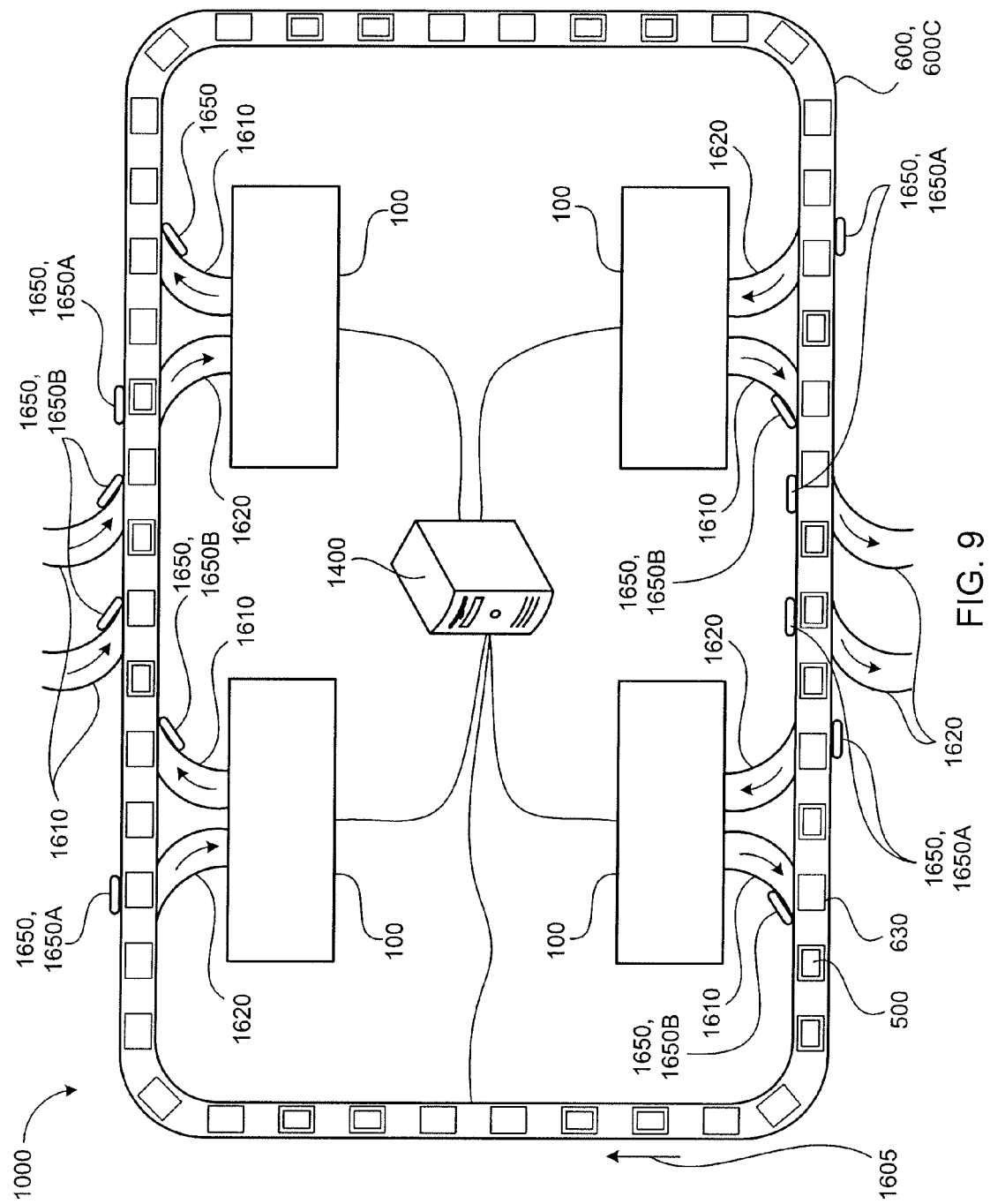
FIG. 9 is a top schematic view of a storage device manufacturing system having a conveyor looped around multiple storage device processing systems.

Referring to FIG. 9, a storage device manufacturing system 1000 includes a conveyor 1600 configured to convey storage devices to and from storage device processing systems 100. In the example shown, the conveyor 1600 is arranged in a loop and has on-ways 1610 and off-ways 1620 for the ingress and egress of storage devices 500 to and from the manufacturing system 1000 and/or between processing systems 100. The on-ways 1610 and off-ways 1620 may include conveyors and/or slide ramps. The storage device processing systems 100 are arranged along the conveyer 1600 and each have on-ways 1610 and off-ways 1620 connected to at least one of its conveyors 600 (e.g., via the loading and unloading stations 610, 620, respectively) for the ingress and egress of storage devices 500 to and from the processing systems 100. The conveyor 1600 may include storage device fixtures 630 configured to receive and/or hold a storage device 500 during conveyance by the conveyor 1600. However, in other implementations, the conveyor 1600 does not include storage device fixtures 630 and instead, the storage devices 500 are placed directly onto and retrieved from the conveyor 1600. In the example shown, the conveyor 1600 is arranged in a loop and includes storage device fixtures 630 spaced by a threshold distance (e.g., a distance that allows movement of the storage device fixtures 630 along a curved path without binding or collision). In some examples, the storage device fixtures 630 are configured to carry a collection of storage devices 500.

The storage device manufacturing system 1000 includes a controller 1400 in communication with the storage device processing systems 100 and the conveyor 1600. The controller 1400 may be configured (e.g., by executing a set of instructions stored in a memory and/or communicated to it) to coordinate the movement and testing of storage devices 500 within the manufacturing system 1000. In some implementations, the controller 1400 determines which storage devices 500 on the conveyor 1600 will be routed to and processed by each storage device processing system 100. The conveyor 1600 includes one or more diverters 1650 for directing storage devices 500 within the manufacturing system 1000. The diverter 1650 directs storage devices 500 onto an off-way 1620, for example, to a processing system 100 or out of the manufacturing system 1000. The diverter 1650 may direct storage devices 500 off of an on-way 1620 onto the conveyor 1600, for example, from a processing system 100 or into the manufacturing system 1000. A storage device 500 may enter the manufacturing system 1000 and be carried by the conveyor 1600 to a processing system 100 designated by the controller 1400 for testing the storage device 500. A diverter 1650 may direct the storage device 500 into the processing system 100 (e.g., onto its loading station 610 and/or onto its conveyor 600). Upon completion of testing, the processing system 100 may direct the tested storage device (e.g., via its unloading station 620) on an associated on-way 1610 back onto the conveyor 1600 where the tested storage device 500 may be directed (e.g., via the controller 1400) to an off-way 1620 to another processing system 100 for additional testing or out of the manufacturing system 1000. Multiple off-ways 1620 may be used to segregate storage device 500 according to properties or categories (e.g., type, tested, untested, passed, failed, etc.).

Figure 12:
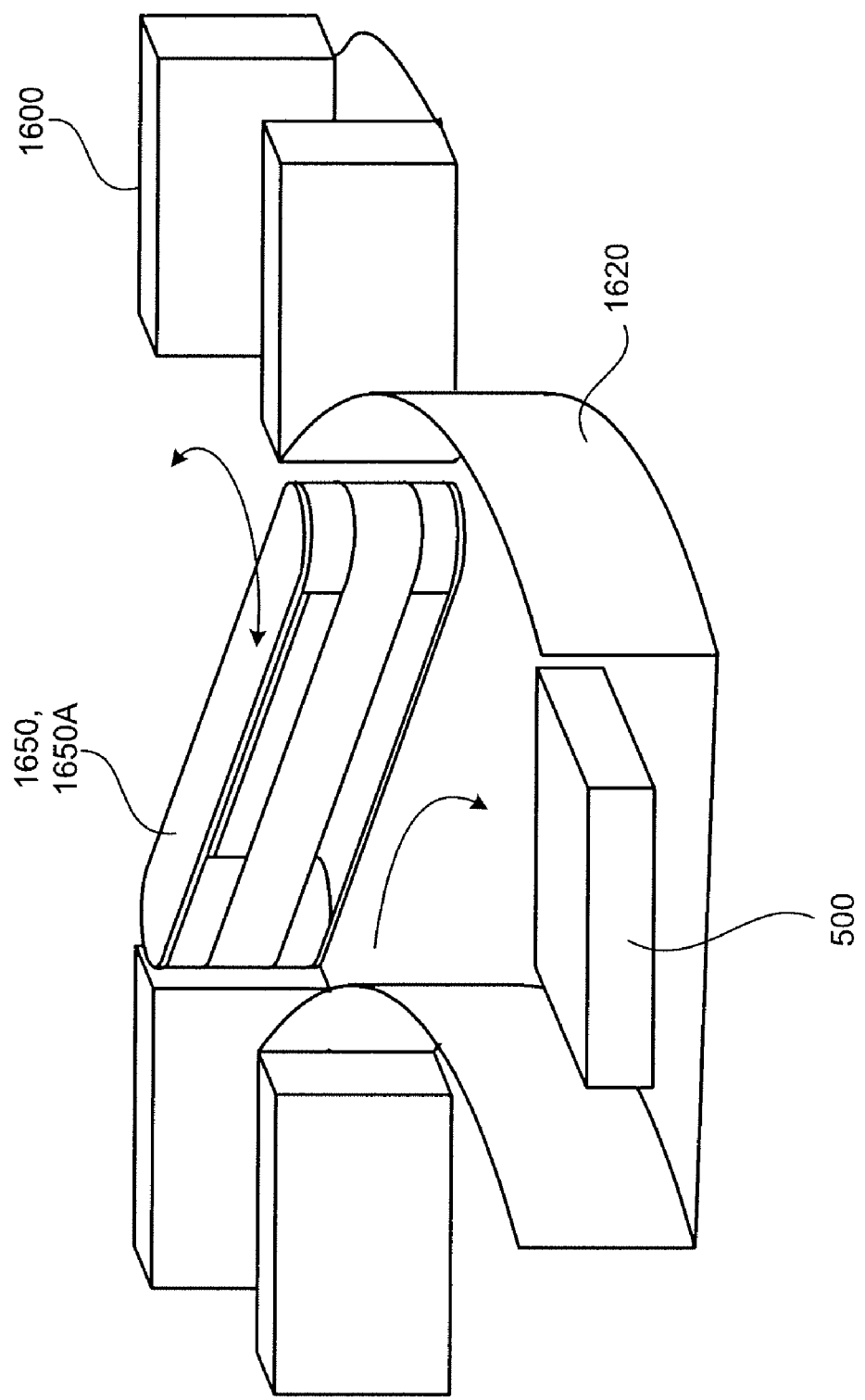
FIG. 12 is a perspective view of a diverter directing a storage device off of a conveyor onto an off-way.

Referring to FIGS. 10-12, in some implementations, the diverter 1650, 1650A includes a diverter body 1652 having first and second rotating cylinders 1654, 1656 about which is mounted a belt 1658. The first cylinder 1654 defines a longitudinal axis 1655 of rotation about which the diverter 1650A rotates to direct storage devices 500. The diverter 1650A may include a drive assembly 1660 (e.g., motor) to rotate the first cylinder 1654 to drive the belt 1658 there about and/or the diverter body 1652 about the longitudinal axis 1655. For example, the diverter 1650A pivots in angular direction about the longitudinal axis 1655 while driving the belt 1658 in the same direction as a travel direction 1605 (FIG. 9) of the conveyor 1600 to divert a storage device 500 carried on the conveyor 1600 onto an off-way 1620 (e.g., toward a processing system 100 or out of the manufacturing system 1000). The belt 1658 may be driven at variable speeds and protects diverted storage devices 500 from scrapping or rubbing along a rigid surface.

Figure 13:
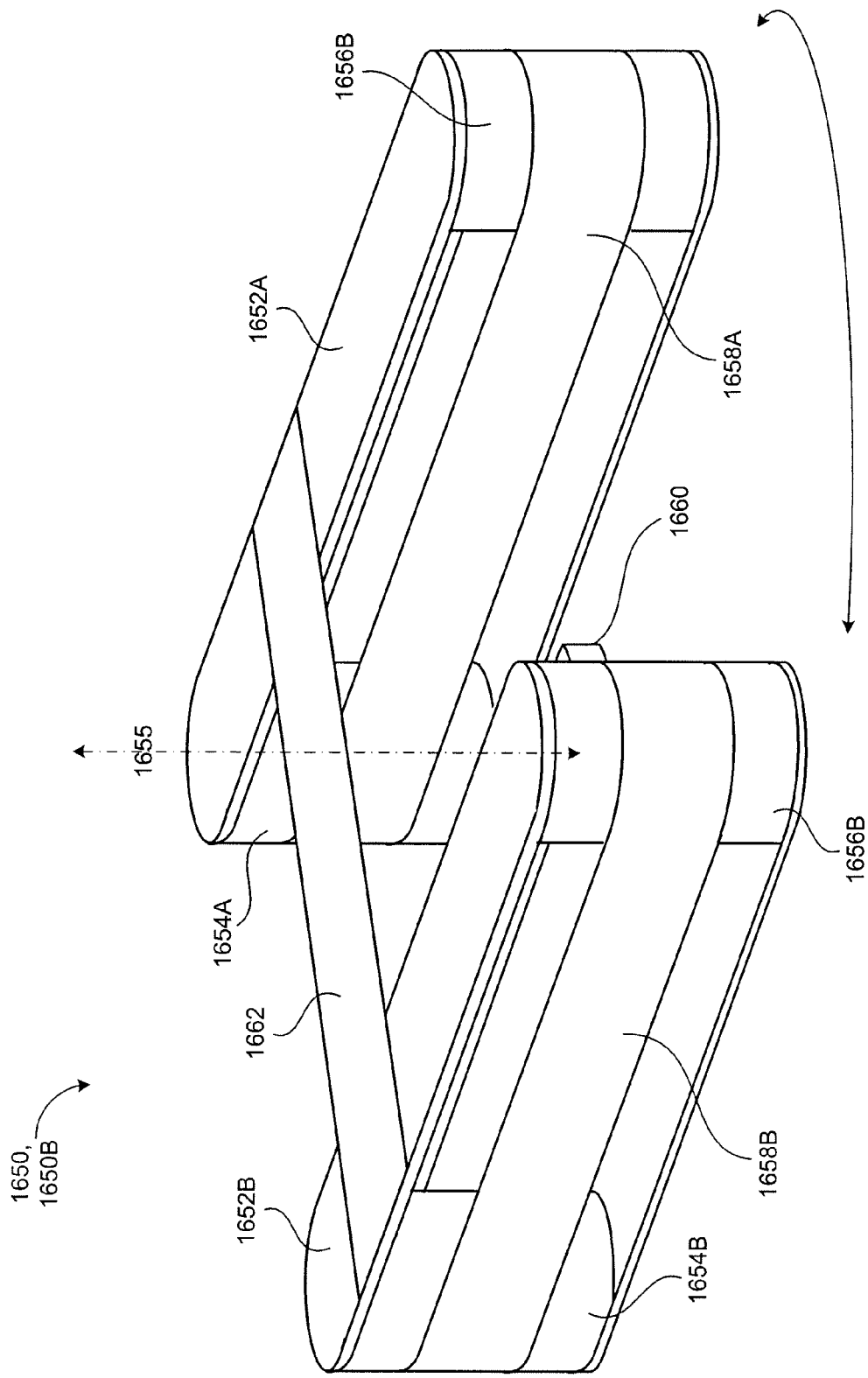
FIG. 13 is a perspective view of a diverter.
Figure 14:
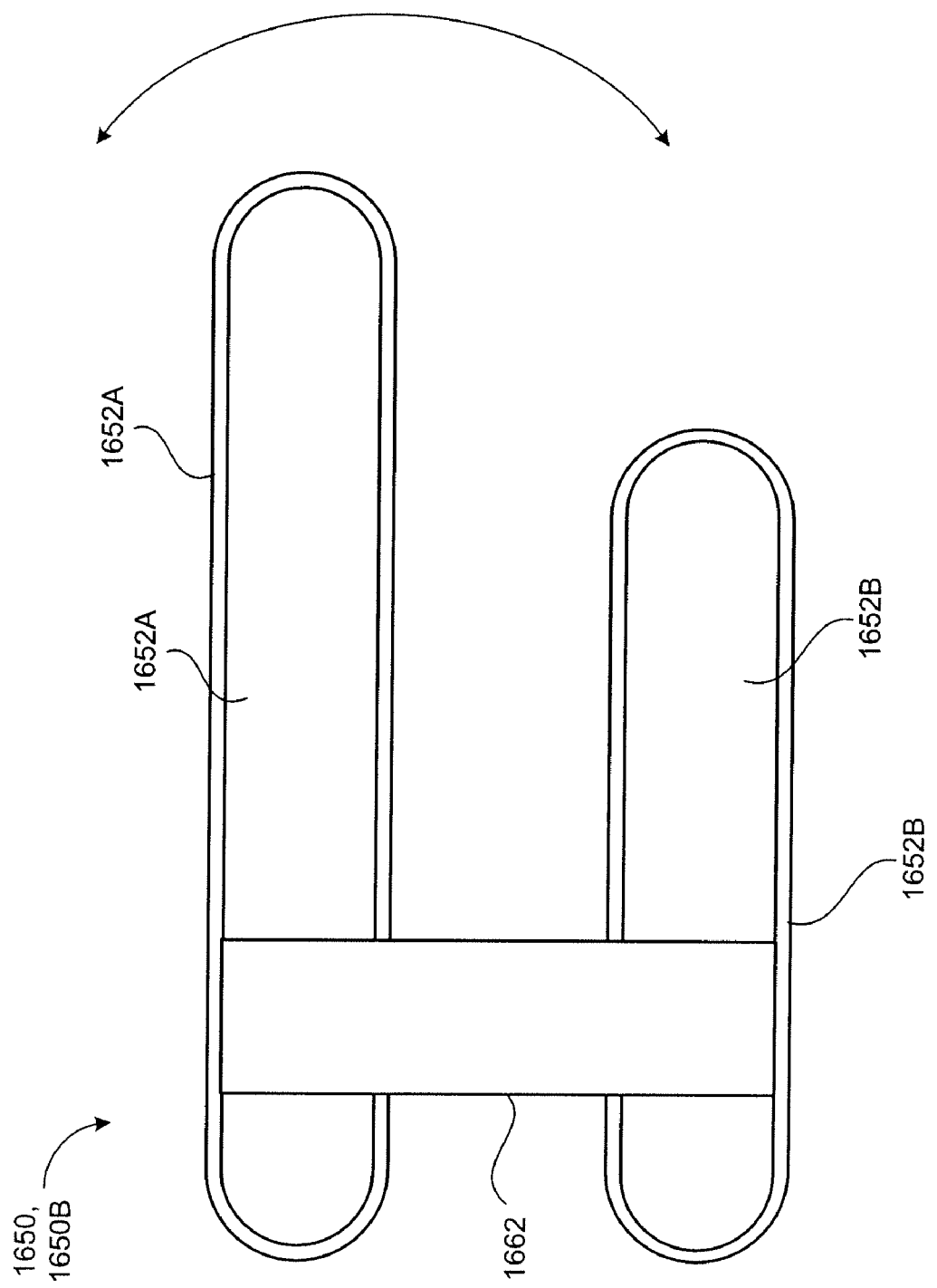
FIG. 14 is a top view of the diverter of FIG. 13.
Figure 15:
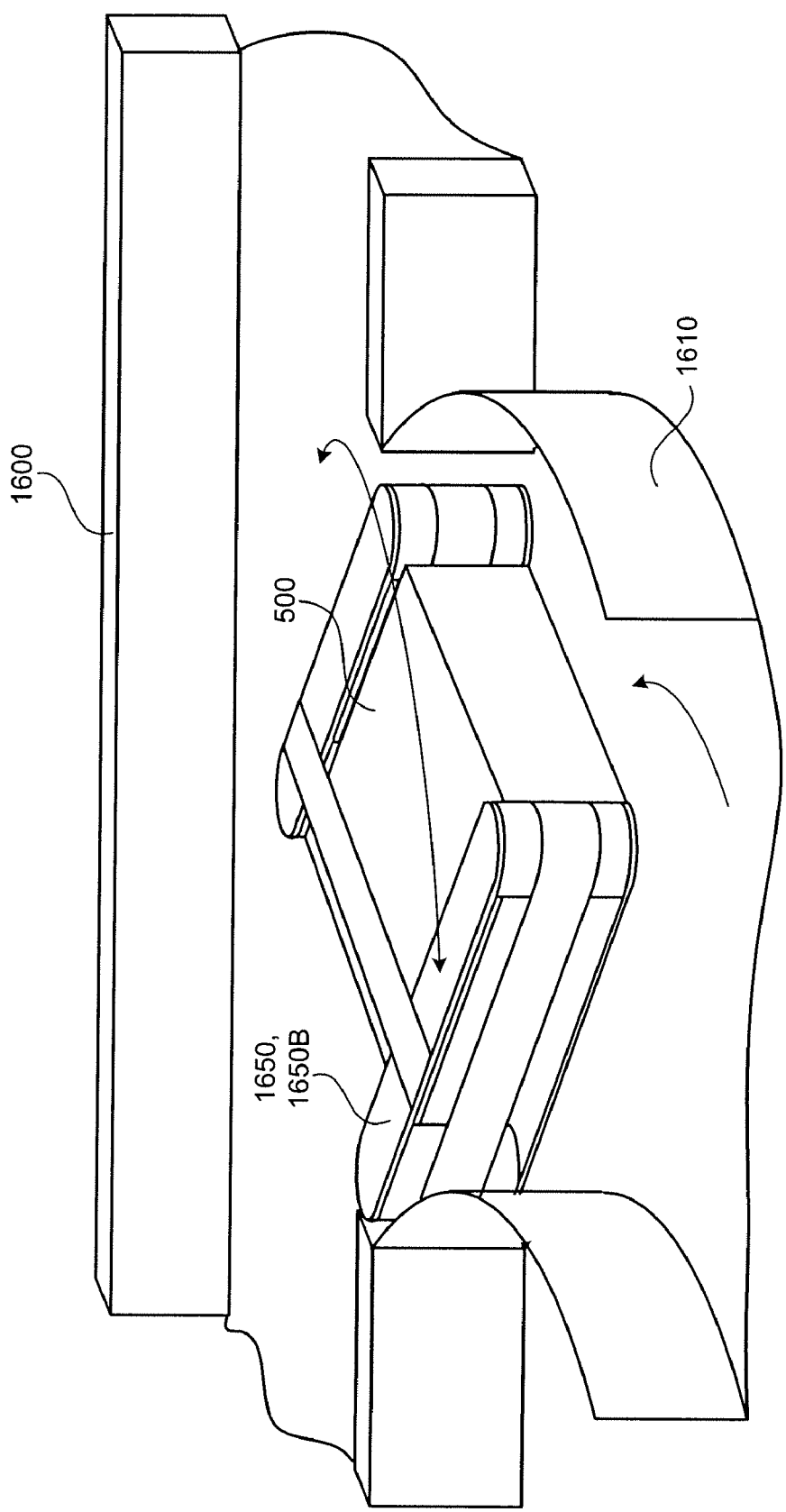
FIG. 15 is a perspective view of a diverter directing a storage device off of an on-way and onto a conveyor.

Referring to FIGS. 13-15, in some implementations, the diverter 1650, 1650B includes first and second diverter bodies 1652A, 1652B and a connector 1662 connecting the first diverter body 1652A to the second diverter body 1652B. Each diverter body 1652A, 1652B supports first and second first and second rotating cylinders 1654A, 1654B, 1656A, 1656B about which is mounted a respective belt 1658A, 1658B. The first cylinder 1654A of the first diverter body 1652A defines a longitudinal axis 1655 of rotation about which the diverter 1650B rotates to direct storage devices 500. The diverter 1650B may include a drive assembly 1660 (e.g., motor) to rotate the first cylinder 1654A of the first diverter body 1652A to drive its belt 1658A there about and/or the first diverter body 1652A about the longitudinal axis 1655. For example, the diverter 1650B pivots in angular direction about the longitudinal axis 1655 while driving the belts 1658A, 1658B in the same direction as the travel direction 1605 (FIG. 9) of the conveyor 1600 to divert a storage device 500 from an in-way 1610 onto the conveyor 1600. In some examples, the connector 1662 is sized such that the storage device 500 fits between and in contact with the two belts 1658A, 1658B of the first and second diverter bodies 1652A, 1652B. The diverter 1650B may be configured to drive the belts 1658A, 1658B to receive and pull the storage device 500 into the diverter 1650B between the first and second diverter bodies 1652A, 1652B. The diverter 1650B may cease driving of the belts 1658A, 1658B once the received storage device 500 is between the first and second diverter bodies 1652A, 1652B to hold it there between. The diverter 1650B may then rotate about the longitudinal axis 1655 to pivot the received storage device 500 from the in-way 1610 onto the conveyor 1600. In some examples, the diverter 1650B lifts (e.g., via the drive assembly 1660) the received storage device 500 vertically (along the longitudinal direction 1655) to reduce scrapping or sliding of any exposed bottom surfaces of the storage device 500 and lowers it onto the conveyer 1600

A number of implementations have been described. Nevertheless, it will be understood that various modifications may be made without departing from the spirit and scope of the disclosure. Accordingly, other implementations are within the scope of the following claims.

What is claimed is:

1. A storage device processing system comprising:
   at least one automated transporter;
   at least one rack accessible by the at least one automated transporter;
   multiple test slots housed by the at least one rack, each test slot being configured to receive a storage device for testing; and
   a conveyor arranged in a loop around and being accessible by the at least one automated transporter, the conveyor receiving and transporting the storage device thereon;
   wherein the at least one automated transporter is configured to transfer the storage device between the conveyor and one of the test slots of the at least one rack.

2. The storage device processing system of claim 1, further comprising a controller in communication with the at least one automated transporter and the at least one rack, the controller configured to control the at least one automated transporter and coordinate movement of the storage device within the storage device processing system.

3. The storage device processing system of claim 2, further comprising
   an identification reader in communication with the controller and configured to read an identifier on at least one of the storage device, and
   a storage device transporter for transferring of the storage device by the at least one automated transporter.

4. The storage device processing system of claim 2, further comprising a storage device fixture for receiving and carrying at least one storage device on the conveyor.

5. The storage device processing system of claim 3, wherein the identification reader is disposed on at least one of
   a manipulator disposed on the at least one automated transporter for transferring the storage device,
   a loading station for receiving the storage device onto the conveyor and
   an unloading station for removal of the storage device from the conveyor.

6. The storage device processing system of claim 1, wherein the conveyor comprises a loading station for receiving the storage device onto the conveyor and an unloading station for removal of the storage device from the conveyor.

7. The storage device processing system of claim 1, further comprising a guide system configured to support multiple automated transporters that move along the guide system to service test slots of the at least one rack.

8. The storage device processing system of claim 1, wherein the at least one automated transporter defines a work zone encompassing multiple test slots of the at least one rack for servicing.

9. The storage device processing system of claim 8, wherein the work zone of each automated transporter is defined by an operating envelope of the respective automated transporter.

10. The storage device processing system of claim 8, wherein the work zone of each automated transporter is defined by a controller in communication with the respective automated transporter.

11. A method of transferring storage devices within a storage device processing system, the method comprising:
    receiving a storage device on a conveyor arranged in a loop around and being accessible by at least one automated transporter;
    actuating the at least one automated transporter to retrieve the storage device from the conveyor; and
    actuating the at least one automated transporter to deliver the retrieved storage device to a test slot of the storage device processing system and to insert the storage device in the test slot.

12. The method of claim 11, further comprising receiving the storage device on the conveyor at a loading station and removing the storage device from the conveyor at an unloading station.

13. The method of claim 11, further comprising:
    actuating the at least one automated transporter to retrieve the storage devices from the test slot; and
    actuating the at least one automated transporter to deliver the retrieved storage device to the conveyor.

14. The method of claim 11, further comprising reading an identifier on at least one of:
    the storage device,
    a storage device transporter for transferring of the storage device by the at least one automated transporter, and
    a storage device fixture for receiving and carrying the storage device on the conveyor for tracking movement of the identifier within the processing system.

15. The method of claim 14, further comprising reading the identifier with an identification reader disposed on at least one of
    a manipulator disposed on the at least one automated transporter for transferring the storage device,
    a loading station for receiving the storage device onto the conveyor and
    an unloading station for removal of the storage device from the conveyor.

16. The method of claim 11, further comprising receiving the storage device in a storage device fixture disposed on the conveyor.

17. The method of claim 11, further comprising determining a work zone of the at least one automated transporter, the work zone encompassing multiple test slots of the at least one rack for servicing by the at least one automated transporter.

* * * * *